United States Patent
Evans

(10) Patent No.: US 11,797,836 B1
(45) Date of Patent: Oct. 24, 2023

(54) SENSOR-INTEGRATED NEURAL NETWORK

(71) Applicant: Waymo LLC, Mountain View, CA (US)

(72) Inventor: Ruffin Evans, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 637 days.

(21) Appl. No.: 16/725,305

(22) Filed: Dec. 23, 2019

(51) Int. Cl.
   *G06N 3/067* (2006.01)
   *G01S 7/02* (2006.01)
   *G01S 13/86* (2006.01)
   *G06N 3/082* (2023.01)

(52) U.S. Cl.
   CPC ............ *G06N 3/067* (2013.01); *G01S 7/022* (2013.01); *G01S 13/865* (2013.01); *G06N 3/082* (2013.01)

(58) Field of Classification Search
   CPC ........ G06N 3/067; G06N 3/082; G01S 7/022; G01S 13/865
   USPC .. 706/15, 22, 29, 40, 12, 13, 14, 23; 700/110
   See application file for complete search history.

(56) References Cited

U.S. PATENT DOCUMENTS

| | | | |
|---|---|---|---|
| 10,268,232 B2 | 4/2019 | Harris et al. | |
| 10,365,350 B2 | 7/2019 | Kamo et al. | |
| 2004/0107172 A1* | 6/2004 | Wang | G06N 3/063 706/40 |
| 2008/0147253 A1 | 6/2008 | Breed | |
| 2008/0270332 A1* | 10/2008 | Rudolf | G06F 18/2135 706/14 |
| 2009/0228408 A1* | 9/2009 | Kaushal et al. | G06N 5/04 714/26 |
| 2009/0240366 A1* | 9/2009 | Kaushal et al. | G06N 20/00 700/110 |
| 2010/0138026 A1* | 6/2010 | Kaushal et al. | G06N 5/04 706/23 |
| 2011/0131162 A1* | 6/2011 | Kaushal et al. | G05B 13/0265 706/13 |
| 2014/0067742 A1* | 3/2014 | Katayama et al. | G06N 3/04 706/29 |
| 2015/0379394 A1* | 12/2015 | Thaler | G06N 3/063 706/22 |
| 2018/0308013 A1 | 10/2018 | O'Shea | |
| 2019/0176841 A1* | 6/2019 | Englard et al. | G05D 1/0248 |
| 2019/0318233 A1* | 10/2019 | Abel et al. | G06N 3/0675 |

\* cited by examiner

*Primary Examiner* — Bo Fan
(74) *Attorney, Agent, or Firm* — MCDONNELL BOEHNEN HULBERT & BERGHOFF LLP

(57) ABSTRACT

A sensor system includes a transmitter configured to emit electromagnetic radiation towards a portion of an environment and an optical neural network configured to receive a reflection of the electromagnetic radiation from the portion of the environment and generate an array of electromagnetic signals. A property of each respective electromagnetic signal of the array of electromagnetic signals represents a corresponding physical characteristic of the portion of the environment. The sensor system also includes a detector array configured to receive the array of electromagnetic signals and including a plurality of electromagnetic signal detectors. Each respective electromagnetic signal detector is configured to measure the property of a corresponding electromagnetic signal of the array of electromagnetic signals and generate, based on the measured at least one property of the corresponding electromagnetic signal, a value representing the corresponding physical characteristic.

20 Claims, 12 Drawing Sheets

SENSOR-INTEGRATED NEURAL NETWORK

BACKGROUND

Light detection and ranging (LIDAR) devices may estimate distances to objects in a given environment. For example, an emitter subsystem of a LIDAR device may emit near-infrared light pulses, which may interact with objects in the device's environment. At least a portion of the light pulses may be redirected back toward the LIDAR (e.g., due to reflection and/or scattering) and detected by a detector subsystem. Conventional detector subsystems may include a plurality of detectors and a corresponding controller configured to determine an arrival time of the respective light pulses with high temporal resolution (e.g., ~400 ps). The distance between the LIDAR device and a given object may be determined based on a time of flight of the corresponding light pulses that interact with the given object.

SUMMARY

An optical neural network (ONN) may be configured to generate an embedding of electromagnetic radiation sensor data. The embedding may be represented as a vector in a multidimensional vector space. The ONN may be integrated with the electromagnetic radiation sensor, and may be situated along a transmission path between a transmitter and a detector array of the sensor. Thus, the sensor data may be optically processed by the ONN to generate the embedding before this embedding, represented as an array of electromagnetic signals, is detected by the detector array. Different values within this embedding may represent, at least in part, different physical properties of a portion of the environment that is represented by the sensor data. By using an ONN made up of optical components, the process of generating the embedding may be faster and may use less energy than an equivalent process executed by way of electrical components.

In a first example embodiment, a sensor system is provided that includes a transmitter configured to emit electromagnetic radiation towards a portion of an environment. The sensor system also includes an optical neural network (ONN) configured to (i) receive a reflection of the electromagnetic radiation from the portion of the environment and (ii) generate an array of electromagnetic signals. At least one property of each respective electromagnetic signal of the array of electromagnetic signals represents a corresponding physical characteristic of a plurality of physical characteristics of the portion of the environment. The sensor system further includes a detector array configured to receive the array of electromagnetic signals and comprising a plurality of electromagnetic signal detectors. Each respective electromagnetic signal detector of the plurality of electromagnetic signal detectors is configured to (i) measure the at least one property of a corresponding electromagnetic signal of the array of electromagnetic signals and (ii) generate, based on the measured at least one property of the corresponding electromagnetic signal, a value representing the corresponding physical characteristic.

In a second example embodiment, a method is provided that includes emitting, by a transmitter, electromagnetic radiation towards a portion of an environment. The method also includes receiving, by an ONN, a reflection of the electromagnetic radiation from the portion of the environment. The method additionally includes generating, by the ONN and based on the reflection, an array of electromagnetic signals. At least one property of each respective electromagnetic signal of the array of electromagnetic signals represents a corresponding physical characteristic of a plurality of physical characteristics of the portion of the environment. The method yet additionally includes receiving, by a detector array that includes a plurality of electromagnetic signal detectors, the array of electromagnetic signals. The method further includes measuring, by each respective electromagnetic signal detector of the plurality of electromagnetic signal detectors, the at least one property of a corresponding electromagnetic signal of the array of electromagnetic signals. The method yet further includes generating, by each respective electromagnetic signal detector and based on the measured at least one property of the corresponding electromagnetic signal, a value representing the corresponding physical characteristic.

In a third example embodiment, a non-transitory computer-readable storage medium is provided having stored thereon instructions that, when executed by a computing device, cause the computing device to perform operations. The operations include causing a transmitter to emit electromagnetic radiation towards a portion of an environment. A reflection of the electromagnetic radiation from the portion of the environment is received by an ONN. The ONN is configured to generate an array of electromagnetic signals. At least one property of each respective electromagnetic signal of the array of electromagnetic signals represents a corresponding physical characteristic of a plurality of physical characteristics of the portion of the environment. The operations also include receiving, from a detector array that includes a plurality of electromagnetic signal detectors, a plurality of values representing the plurality of physical characteristics. The detector array is configured to receive the array of electromagnetic signals. Each respective electromagnetic signal detector of the plurality of electromagnetic signal detectors is configured to measure the at least one property of a corresponding electromagnetic signal of the array of electromagnetic signals. Each respective electromagnetic signal detector is configured to generate, based on the measured at least one property of the corresponding electromagnetic signal, a value representing the corresponding physical characteristic.

In a fourth example embodiment, a system is provided that includes means for emitting electromagnetic radiation towards a portion of an environment. The system also includes optical means for (i) receiving a reflection of the electromagnetic radiation from the portion of the environment and (ii) generating an array of electromagnetic signals. At least one property of each respective electromagnetic signal of the array of electromagnetic signals represents a corresponding physical characteristic of a plurality of physical characteristics of the portion of the environment. The system further includes an array of detector means for receiving the array of electromagnetic signals. Each respective detector means of the array of detector means is configured to (i) measure the at least one property of a corresponding electromagnetic signal of the array of electromagnetic signals and (ii) generate, based on the measured at least one property of the corresponding electromagnetic signal, a value representing the corresponding physical characteristic.

In a fifth example embodiment, a method of training an ONN is provided. The method includes obtaining training data comprising a plurality of sets of (i) a waveform representing a reflection of electromagnetic radiation from a respective portion of an environment and (ii) an indication of one or more physical characteristics of the respective portion. The method also includes selecting a plurality of values for a plurality of parameters of the ONN. The method additionally includes generating, by way of the ONN and based on a respective waveform of a corresponding set of the plurality of sets of training data, one or more values representing a measurement of the one or more physical characteristic of the respective portion of the corresponding set. The method further includes comparing, using a loss function, the measurement to the indication in the corresponding set to generate an error measure. The method yet further includes, based on the error measure, adjusting one or more values of the plurality of values of the plurality of parameters of the ONN to reduce the error measure.

In a sixth example embodiment, a sensor system is provided that includes an ONN and circuitry configured to perform operations in accordance with the fifth example embodiment.

In a seventh example embodiment, a non-transitory computer-readable storage medium is provided having stored thereon instructions that, when executed by a computing device, cause the computing device to perform operations in accordance with the fifth example embodiment.

In an eighth example embodiment, a system is provided that includes means for performing operations in accordance with the fifth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
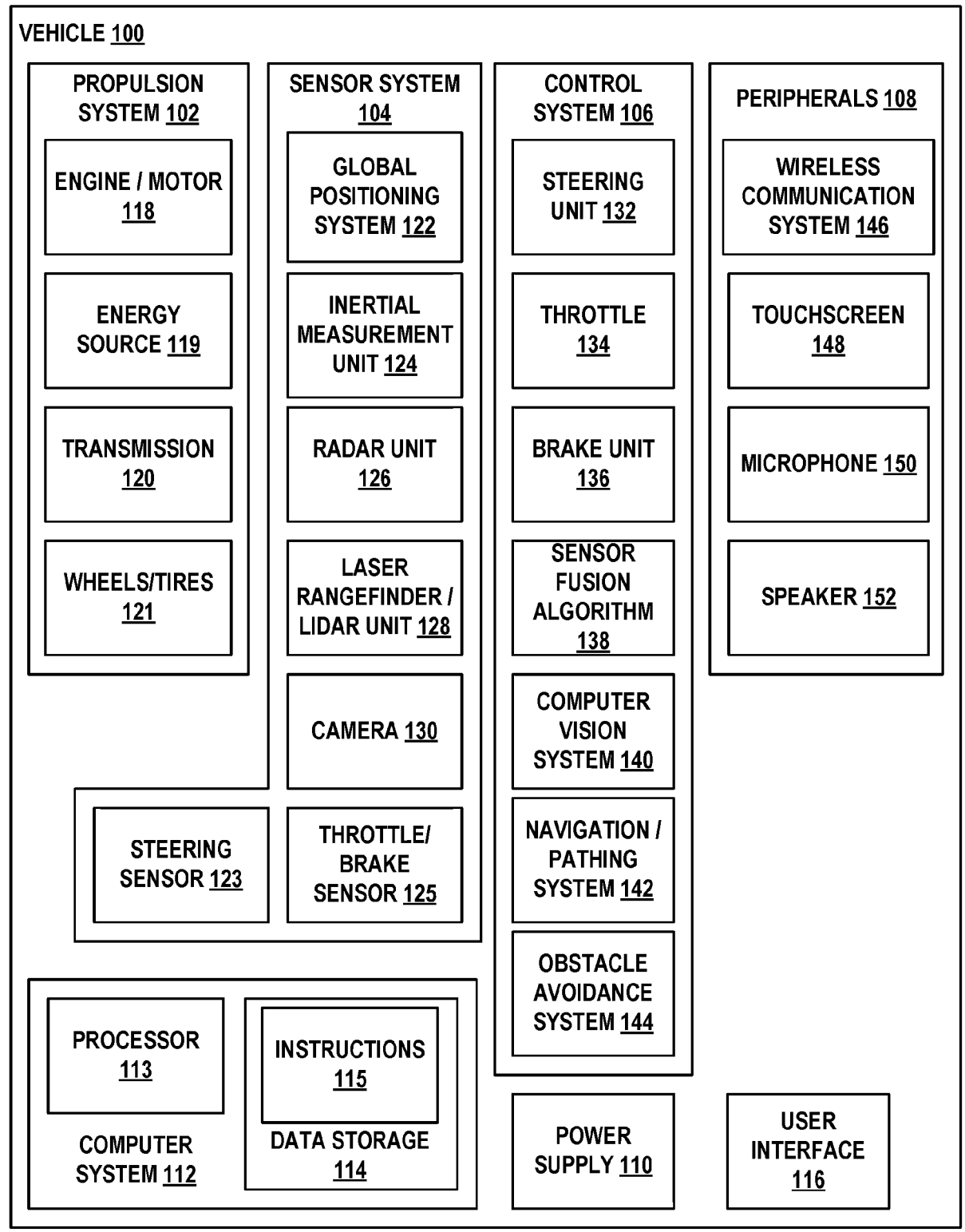
FIG. 1 illustrates a block diagram of a vehicle, in accordance with example embodiments.
Figure 2A:
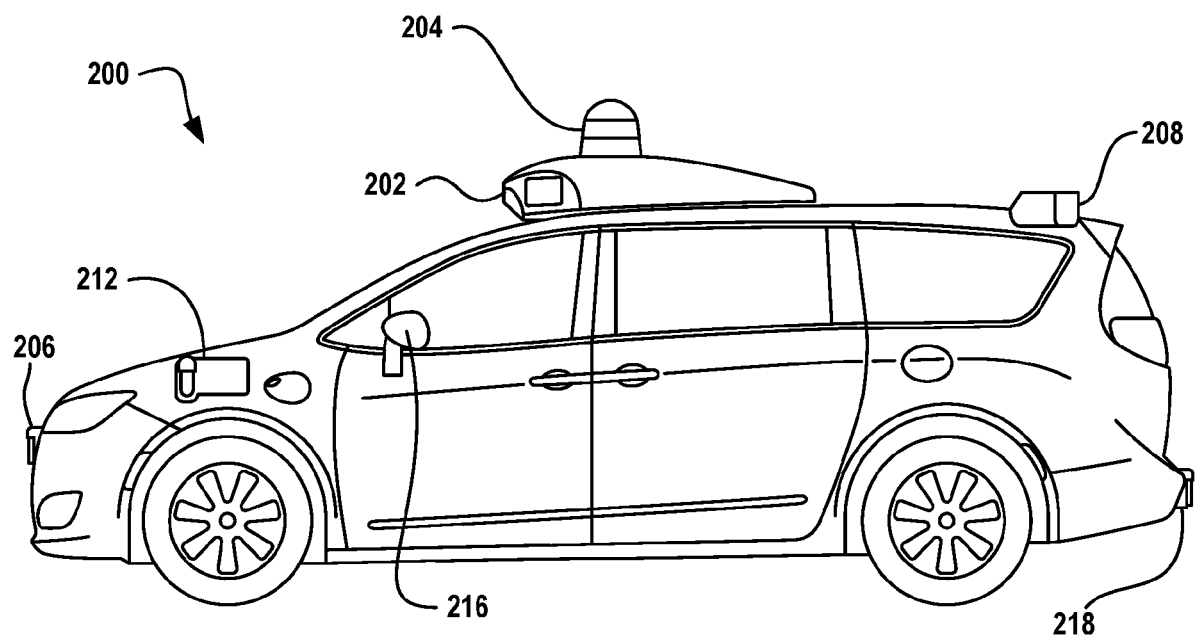
FIGS. 2A, 2B, 2C, 2D, and 2E illustrate a physical configuration of a vehicle, in accordance with example embodiments.
Figure 2B:
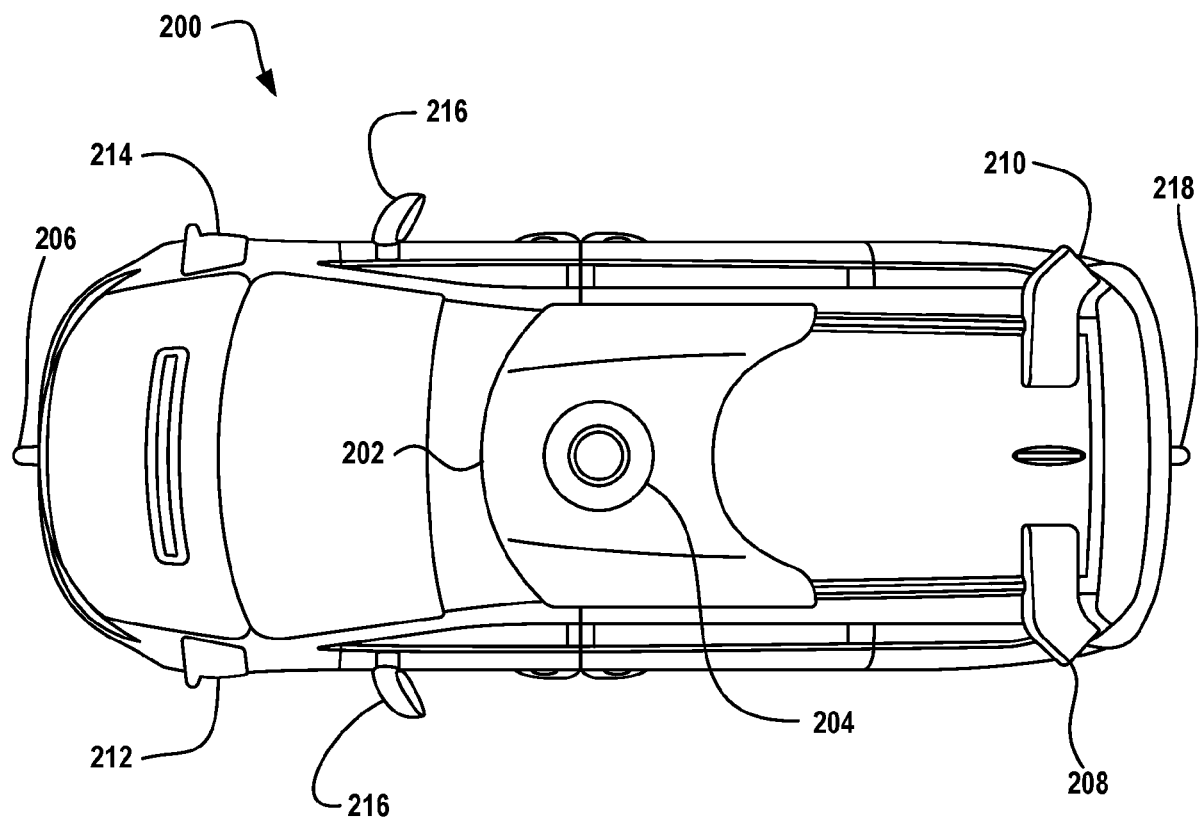
Figure 2C:
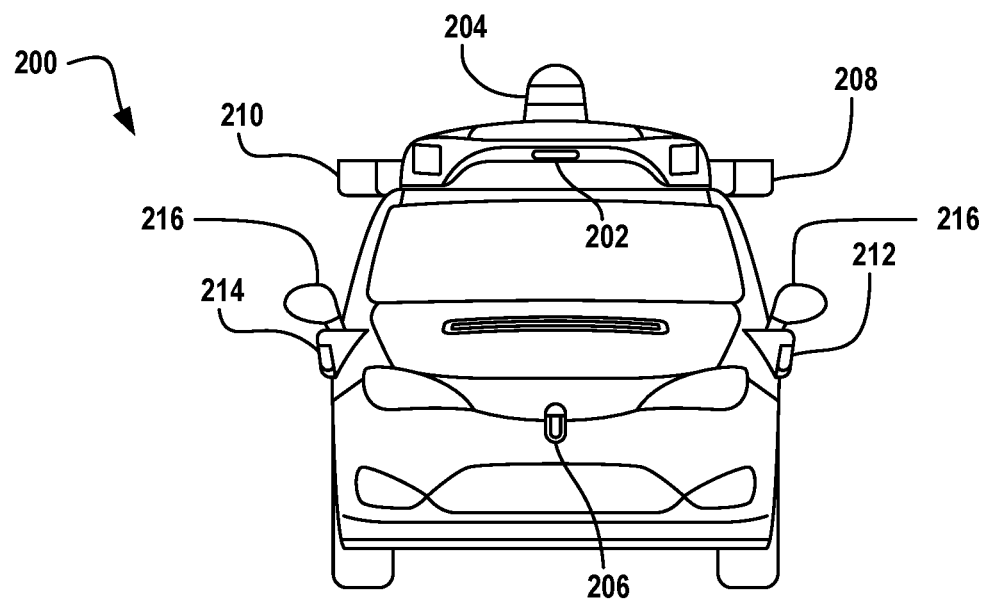
Figure 2D:
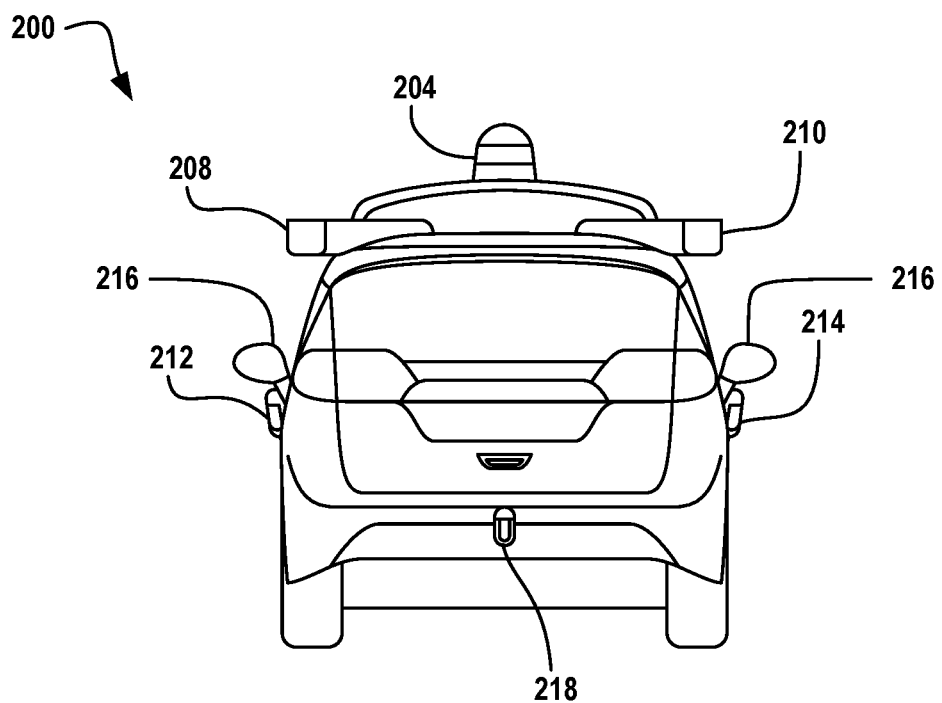
Figure 2E:
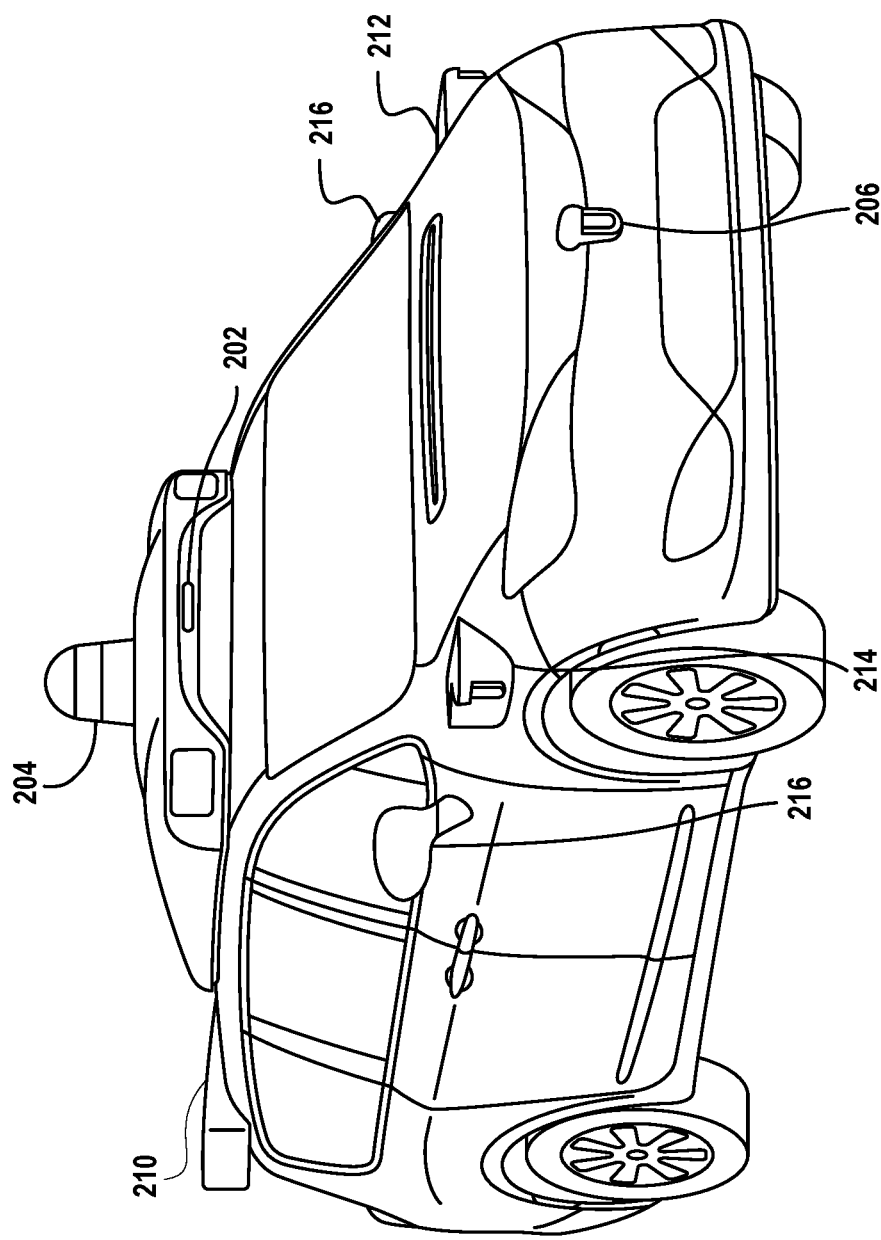

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

An autonomous vehicle may be configured to traverse an environment based on data from one or more sensors positioned thereon. These sensors may include, for example, a light detection and ranging (LIDAR) device and/or a radio detection and ranging (RADAR) device, among other sensors that operate by projecting and/or detecting electromagnetic radiation. In the example case of LIDAR, the LIDAR device may determine distances to various points within the environment by projecting light pulses onto the environment and detecting corresponding return light pulses reflected from the various points within the environment. The intensity of these reflections (i.e., the return light pulses) may be measured by the LIDAR device and represented as a waveform that indicates the intensity of detected light over time. Thus, each point detected within the environment, and the physical characteristics of this point, may be represented by a corresponding respective reflection and waveform.

These waveforms may be processed using various signal processing techniques and algorithms to measure the physical characteristics associated with each of the points within the environment. Such signal processing techniques and algorithms may utilize or rely on predetermined equations or expressions to measure the respective physical characteristics, properties, and/or quantities. These equations or expressions may define a relationship between one or more characteristics of the waveform and corresponding physical characteristics of the points in the environment. In some cases, for example, the equations may be closed-form equations that can be evaluated in a finite number of operations.

For example, the amount of time between (i) projecting a light pulse and (ii) detecting a corresponding return light pulse may be used to determine the distance between the LIDAR and a particular point within the environment. As another example, the intensity of the return light pulse (e.g., relative to an intensity of the corresponding source light pulse) may be used to determine the reflectivity of a surface underlying the particular point in the environment. Other aspects of the return light pulse (e.g., a width of the return light pulse) represented by the waveform may be similarly measured and used to determine a metric of a corresponding physical characteristic of the particular point within the environment.

While these techniques or algorithms may allow for calculation of values that quantify many different physical characteristics of points within the environment, each return light pulse may contain therein additional information and details that might not be easily identified and/or measured using such predetermined algorithms or expressions. For example, the return light pulse may include semantic information about the environment. This semantic information may be contained in the patterns present in the return light pulses. Such patterns may represent the physical properties of corresponding surfaces or objects in the environment and, if detected, may allow these physical properties to be quantified.

Specifically, for some physical properties, a predetermined algorithm that expresses a relationship between these physical properties and a particular pattern or characteristic in the return pulse might not be available. In other cases, such predetermined algorithms may be available, but measuring the physical properties using these predetermined algorithms may be difficult, impractical (e.g., not fast enough), and/or computationally expensive. Further, some information about these physical properties may be lost when the return pulse is measured by the detector and sampled to generate a digital waveform.

Accordingly, an embedding model may be trained to extract, from the return light pulse, measurements of the physical properties or characteristics associated with a corresponding portion of (e.g., point in or region of) the environment. Specifically, the embedding model may be implemented as an optical neural network (ONN). Unlike the predetermined signal processing algorithms, the ONN may express an empirically-derived relationship between characteristics of the reflected electromagnetic radiation and the physical characteristics of the environment. This empirically-derived relationship may be based on training data, and may thus express semantic relationships present in the training data.

The ONN may be disposed along a transmission path (e.g., an optical path) between a transmitter of the sensor (e.g., LIDAR device) and a detector array thereof. That is, the ONN may be positioned such that reflections from the environment of radiation emitted by the transmitter are incident on the ONN and are processed by the ONN before reaching the detector array. Thus, the ONN may compute the embedding optically, before the reflected light reaches the detector array, rather than computing the embedding electronically by way of an embedding model positioned down-stream of the detector array.

In some implementations, a beam splitter may be configured to direct a first portion of the electromagnetic radiation emitted by the transmitter towards the environment and a second portion towards the ONN. Thus, the ONN may be configured to compute the embedding further based on the second portion of the electromagnetic radiation and any information contained therein. Similarly, another beam splitter may allow a portion of the reflected light pulse to be processed by the ONN, and another portion of the reflected light pulse to be sampled and processed using various signal processing techniques and algorithms (e.g., as described above). Thus, the ONN may operate in parallel with a signal processor executing these various signal processing techniques and algorithms.

The ONN may be configured to generate an array of electromagnetic (e.g., optical) signals. Each electromagnetic signal of the array may represent a corresponding physical characteristic of the portion of the environment from which the measured pulse was reflected. The value of the physical characteristic may be encoded in the timing, phase, amplitude, polarization, or other property of the corresponding electromagnetic signal. In some cases, the array of electromagnetic signals may be viewed as forming a vector, and may thus be referred to as an embedding vector. An electrical (e.g., digital) representation of this embedding vector may be obtained by measuring the wave properties of the electromagnetic signals of the array by way of the detector array.

The specific physical characteristic represented by a given value within the embedding vector might not be known and/or might not be human-interpretable. In fact, the specific physical characteristic represented by a given value within the embedding vector might not need to be known to allow the ONN to facilitate detection and classification of various physical features within the environment. Specifically, the values of the embedding vector may be machine-interpretable such that, for example, a neural network may be configured to use these values to detect and classify features within the environment.

The ONN may replicate or approximate the operations of an artificial neural network. However, rather than being implemented as software and/or electronic hardware, the ONN may be implemented using optical components and may thus compute the embedding optically. Such optical computation of the embedding may use less power and may be performed faster than a similar electronics-based computation. Further, by operating directly on the return pulse in its electromagnetic (e.g., optical) form, the ONN may embed any information that might otherwise be lost in the process of sampling the return pulse to generate an electrical representation thereof.

In an example implementation, the ONN may include an input layer configured to receive the reflected pulse and generate an input array of electromagnetic signals based thereon. Thus, the input layer may allow a single light beam to be connected or spread to a plurality of optical components acting as neurons in subsequent layers of the ONN.

The ONN may also include one or more hidden layers optically connected to the input layer. The hidden layers may be configured to generate, based on the input array of electromagnetic signals, an output array of electromagnetic signals that represents the embedding. Each hidden layer may include a first optical component configured to receive an array of electromagnetic signals from a preceding layer of the ONN and perform a linear transformation thereof to generate an intermediate array of electromagnetic signals. The first optical component may implement matrix multiplication of the electromagnetic signals, thus optically implementing a weighted summation of inputs to respective neurons.

Each hidden layer may also include a second optical component configured to receive the intermediate array of electromagnetic signals from the first optical component and perform a non-linear transformation of the intermediate array. Thus, the second optical component may optically implement an activation function for each neuron. In some cases, the detector array may be viewed as representing an output layer of the ONN. Alternatively or additionally, the ONN may include a distinct output layer disposed between a last of the hidden layers and the detector array.

While the ONN may be described in the examples provided herein as operating on electromagnetic radiation utilized by a LIDAR device (e.g., electromagnetic radiation having a wavelength between 10 microns and 250 nanometers), the ONN may alternatively or additionally be configured to operate on other portions of the electromagnetic spectrum. For example, when utilized as part of a RADAR device, the ONN may operate on wavelengths from 2.7 millimeters to 100 meters, for example. The physical implementation of the ONN may depend on properties of the portion of the electromagnetic spectrum on which the ONN is to operate. In implementations that utilize portions of the electromagnetic spectrum that are not commonly referred to as "optical," the ONN may be referred to by other names (e.g., microwave neural network (MNN) or radio neural network, in the case of RADAR). However, the ONN is herein referred to as "optical" for consistency and clarity of description. Thus, ONN may refer to any neural network operating directly on the analog electromagnetic signal having any wavelength, which includes optical wavelengths (e.g., visible/near IR wavelengths in LIDAR), and/or radio-frequency and microwave wavelengths (e.g., in RADAR). Further, although the ONN is described herein as implementing a neural network, the ONN may additionally or alternatively implement other types of machine learning models and algorithms.

The ONN embedding model may be used in combination with a feature detector configured to detect or classify physical features within the environment. The feature detector may operate on a map that represents therein the positions of each of the points detected within the environment along with the embedding vectors thereof. In this way, physical features may be detected within the environment based on both (i) physical characteristics computed using predetermined signal processing algorithms and (ii) values computed by the ONN.

The feature detector may take the form of a machine learning algorithm (e.g., artificial neural network), a predetermined image, map, or model processing algorithm, or a combination thereof. The ONN may be co-trained with the feature detector to configure the ONN to generate vector values that are meaningful in representing the physical characteristics of the physical features that the feature detector is configured to detect. Thus, the feature detector may provide an objective way to quantify how well the values of the embedding vector generated by the ONN represent the physical characteristics of points within the environment, thus allowing the ONN to be refined to produce more accurate embedding vectors.

II. Example Vehicle Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robotic devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). Further, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM) / general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, BLUETOOTH®, or ZIGBEE®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by other systems. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both.

Furthermore, the example vehicle 200 can include any of the components described in connection with vehicle 100 of FIG. 1. The first and second radar units 208, 210 and/or the first and second LIDAR units 204, 206 can actively scan the surrounding environment for the presence of potential obstacles and can be similar to the radar 126 and/or laser rangefinder / LIDAR 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first LIDAR/radar unit 212 and the second LIDAR/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object.

The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
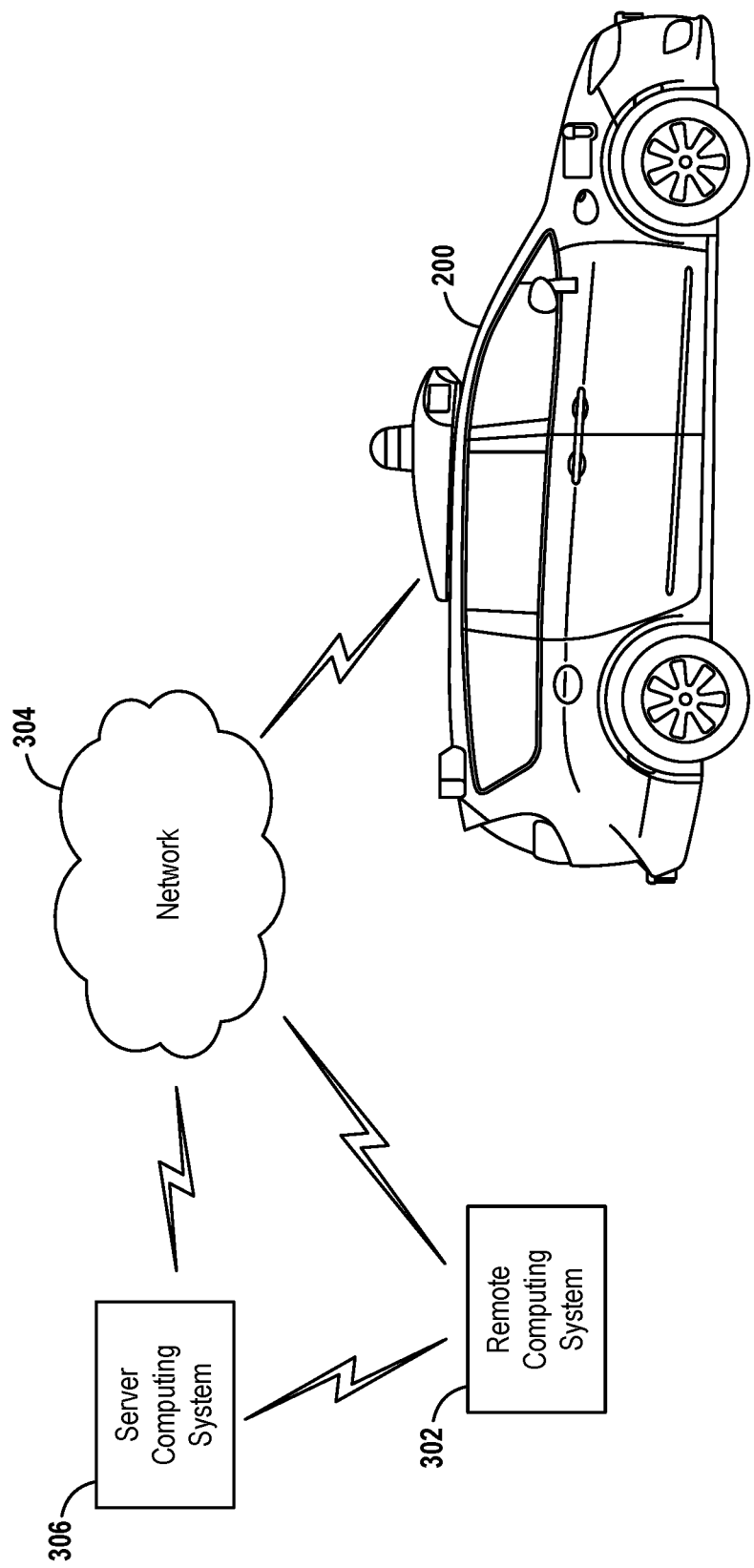
FIG. 3 illustrates wireless communication between various computing systems related to an autonomous vehicle, in accordance with example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 100 or vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation, a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a LIDAR unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

III. Example Sensor Systems With Integrated Neural Networks

Figure 4A:
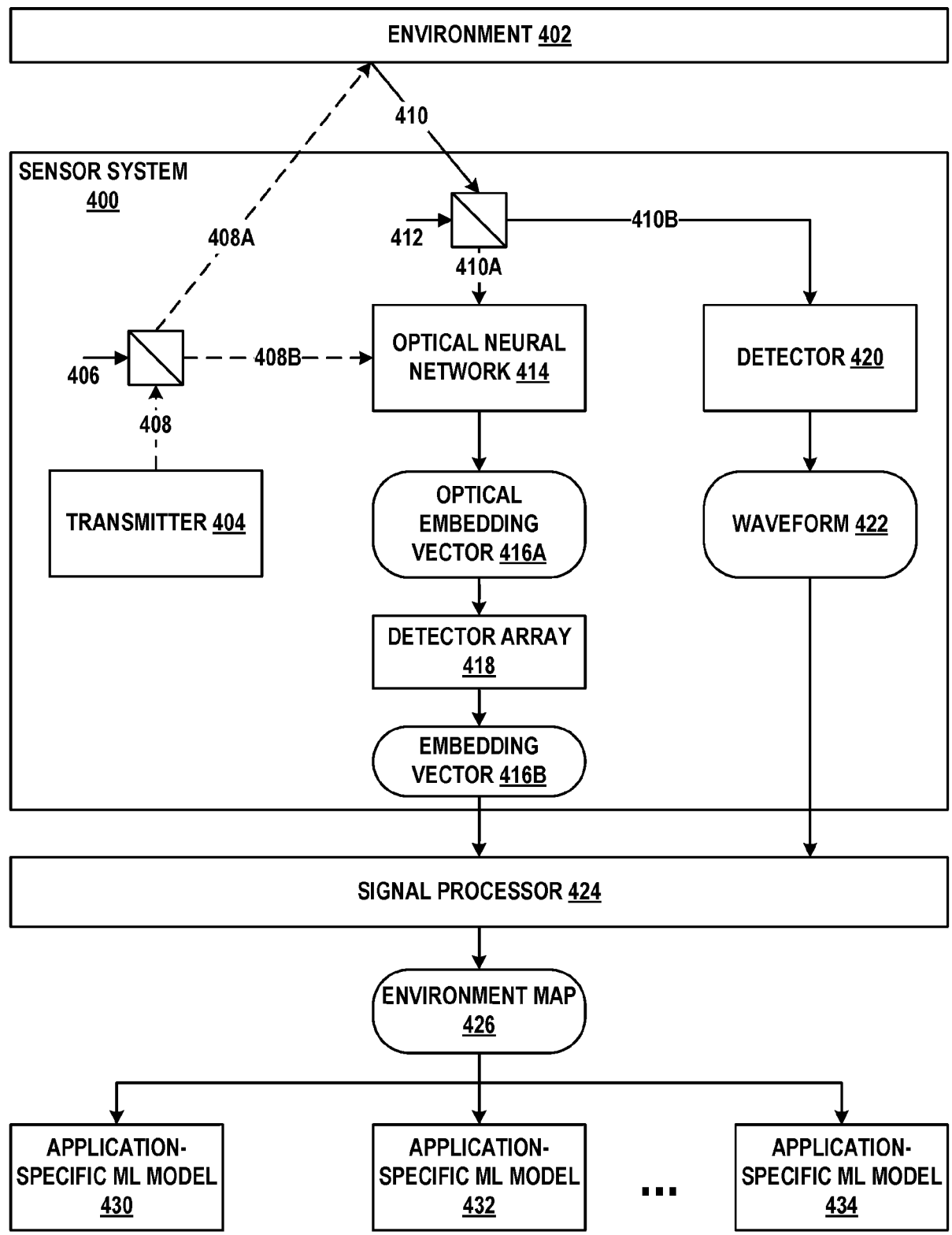
FIG. 4A illustrates a sensor system, in accordance with example embodiments.

FIG. 4A illustrates an example system which may be used to generate a map of environment 402 through which an autonomous vehicle is navigating, detect physical features within environment 402, generate navigable paths through environment 402, and perform other tasks related to allowing the vehicle to autonomously traverse environment 402. The system includes sensor system 400, signal processor 424, and application-specific machine learning (ML) models 430 and 432 through 434 (i.e., ML models 430 - 434).

The system may be implemented by and/or include various combinations of the components of vehicles 100 or 200.

Sensor system 400 includes transmitter 404, signal splitters 406 and 412, ONN 414, detector array 418, and detector 420. Sensor system 400 may represent, for example, a light detection and ranging (LIDAR) device (e.g., LIDAR unit 128) or a radio detection and ranging (RADAR) device (e.g., RADAR unit 126), among other possibilities. In addition to providing sensor data for computing the range of various points within environment 402, sensor system 400 may be configured to optically compute, for each of these points, an embedding that represents the physical properties associated therewith.

Transmitter 404 may be configured to emit electromagnetic radiation 408. The timing, wavelength (and thus also the frequency), phase, amplitude, and/or polarization of radiation 408 may vary depending on the type of sensor represented by sensor system 400. For example, when sensor system 400 is implemented as a LIDAR device, radiation 408 may have a wavelength of 905 nanometers, and transmitter 404 may be implemented as a laser diode. As another example, when sensor system 400 is implemented as a RADAR device, radiation 408 may have a frequency of 77 GigaHertz, and transmitter 404 may be implemented as a radio antenna. Signal splitter 406 may be configured to direct a first portion 408A of radiation 408 at environment 402 and a second portion 408B at ONN 414. In some implementations, signal splitter 406 may be omitted and transmitter 404 may instead project radiation 408 directly at environment 402. In other implementations, such as in a camera device that utilizes ambient light, rather than active illumination, transmitter 404 may also be omitted. In some embodiments, sensor system 400 may include one or more lenses, mirrors, antennas, waveguides, and/or other components configured to facilitate directing of radiation 408A toward environment 402.

Electromagnetic radiation 408A may be reflected by environment 402, thereby directing reflection 410 back towards sensor system 400, where one or more lenses, mirrors, antennas, waveguides, and/or other components may direct reflection 410 toward signal splitter 412. Signal splitter 412 may be configured to direct a first portion 410A of reflection 410 at ONN 414 and a second portion 410B at detector 420. In some embodiments, signal splitter 412 and detector 420 may be omitted. Thus, the entirety or reflection 410 may be directed towards ONN 414.

ONN 414 represents an optical implementation of an artificial neural network. ONN 414 may be configured to receive as input reflection 410A (or reflection 410 in its entirety when signal splitter 412 is omitted) and, based thereon, may be configured to generate optical embedding vector 416A. In embodiments where signal splitter 406 is present and ONN 414 also receives as input radiation 408B, ONN 414 may be viewed as operating in a homodyne mode. In embodiments where signal splitter 406 is omitted and ONN 414 uses a reference signal different from radiation 408B as input, ONN 414 may be viewed as operating in a heterodyne mode.

Unlike neural networks implemented as software or electronic hardware, ONN 414 may include optical components that, at least in part, perform the computation of optical embedding vector 416A. In some implementations, ONN 414 may be an all-optical neural network that uses only optical components (some of which may be electrically-controllable) to determine optical embedding vector 416A. In other implementations, ONN 414 may include a combination of optical components, electronic hardware, and/or software.

Optical embedding vector 416A may represent a plurality of physical characteristics of environment 402 as an array of electromagnetic signals. The physical characteristics may include characteristics of a respective point or surface in environment 402 from which radiation 408A was reflected to generate reflection 410, as well as properties of a medium that separates sensor system 400 from the respective point and through which radiation 408A and return 410 travel. In some embodiments, optical embedding vector 416A may represent the physical characteristics in a point-wise manner. Specifically, a different embedding vector may be generated for each respective point of a plurality of points scanned within environment 402. In other embodiments, optical embedding vector 416A may simultaneously represent the physical characteristics of a plurality of points (e.g., a surface). For example, a particular embedding vector may represent 4 points of the plurality of points within environment 402 (e.g., when a LIDAR projects and detects 4 beams in parallel).

Each respective electromagnetic signal of the array may represent a corresponding physical characteristic of the plurality of physical characteristics. Specifically, the corresponding physical characteristic may be represented by at least one property of the respective electromagnetic signal, such as its timing, amplitude, frequency, phase, polarity, and/or changes therein. Thus, ONN 414 may be configured to extract the physical characteristics of points in environment 402 from reflection 410A, and encode the physical characteristics in properties of a plurality of electromagnetic signals that form optical embedding vector 416A.

Optical embedding vector 416A may be sampled (i.e., converted to an electrical signal) by way of detector array 418. Detector array 418 may include a plurality of electromagnetic signal detectors. In one example, a number of the electromagnetic signal detectors may be equal to a number of elements in optical embedding vector 416A. Detector array 418 may be configured to receive the array of electromagnetic signals that defines optical embedding vector 416A, measure the properties used to encode information about the physical properties of environment 402, and generate values representing the measurement of the properties. To that end, detector array 418 may be aligned with or connected to ONN 414 such that the array of electromagnetic signals that define optical embedding vector 416A are incident on the signal detectors. Detector array 418 may be configured to generate an output embedding vector 416B, which represents an electrical representation of optical embedding vector 416A. Embedding vectors 416A and 416B are illustrated and discussed in more detail in FIG. 4B.

Detector 420 may be configured to generate, for each respective point of the plurality of points within environment 402, a corresponding waveform 422. Specifically, detector 420 may be configured to measure an intensity of reflected pulse 410B (i.e., return pulse) over time and generate an electrical representation thereof in the form of waveform 422. Much like return pulse 410, waveform 422 may contain therein information regarding the physical properties associated with the point within environment 402 from which radiation 408A was reflected. In addition to representing the corresponding return pulse 410B, waveform 422 may also represent the intensity of light detected by detector 420 before and after the corresponding pulse is detected, thereby representing ambient/background conditions of the environment. In some cases, the informational content of waveform 422 may be redundant to the informational content of embedding vector 416B. Accordingly, in such cases, signal splitter 412 and detector 420 may be omitted from sensor system 400. Thus, any information discussed herein as being contained in waveform 422 may additionally or alternatively be represented by one or more values of embedding vector 416B.

In some implementations, waveform 422 may be usable to generate an embedding by way of an embedding model analogous to ONN 414 but implemented in software or electronic hardware. Such an embedding may be analogous to embedding vector 416B and may contain similar information regarding the physical characteristics of points within environment 402. Notably, however, due to the use of ONN 414, computation of embedding vector 416B may be faster and may utilize less energy than an analogous computation executed by a non-optical embedding model. Additionally, since ONN 414 operates on reflection 410A directly, rather than on a sampled version thereof as represented by waveform 422, ONN 414 may be able to embed the physical properties of environment 402 more accurately and/or embed a larger number of these physical properties in embedding vector 416B.

Embedding vector 416B and waveform 422 may be provided as input to signal processor 424. In cases where the informational content of waveform 422 is redundant to the informational content of embedding vector 416B, waveform 422 may be omitted. Signal processor 424 may be communicatively coupled to sensor system 400. Signal processor 424 may be implemented as software instructions executable by a processor (e.g., processor 113), as programmable circuitry (e.g., field-programmable gate arrays (FPGA)), as purpose-built circuitry (e.g., application-specific integrated circuit (ASIC)), or a combination thereof. Thus, signal processor 424 may alternatively be referred to as, for example, signal processing circuitry or a digital signal processor (DSP).

Signal processor 424 may be configured to determine, based on a plurality of embedding vectors 416B and/or waveforms 422, environment map 426 representing environment 402. Environment map 426 may be, for example, a three-dimensional model such as a point cloud. Accordingly, signal processor 424 may determine, for each point scanned in environment 402, a position within map 426. In some embodiments, each point within environment map 426 may be associated with its corresponding embedding vector 416B. For example, for each respective point represented in map 426, the values of embedding vector 416B associated with the respective point may be appended to coordinates of the respective point within map 426. Thus, each respective point represented in map 426 may be associated with a corresponding data structure that defines at least (i) coordinates of the respective point within maps 426, (ii) values of physical properties determined for the respective point by signal processor 424 (as discussed below), and (iii) values of the embedding vector 416B determined for the respective point by sensor system 400.

Signal processor 424 may also be configured to determine, based on waveform 422, one or more other physical properties associated with a respective point. In one example, signal processor 424 may be configured to determine these physical properties by way of predetermined algorithms or equations. Each of the predetermined algorithms may define a relationship between (i) a feature of waveform 422 and (ii) the corresponding physical property. Thus, the output of each of the predetermined algorithms may provide an explicit metric of a corresponding physical property, and may be human-interpretable.

In some cases, the predetermined algorithms may be derived from first principles of physics, as opposed to being derived empirically, through trial-and-error, or through another example-based (e.g., supervised) learning process. In some cases, the predetermined algorithms may be entirely defined by programmers (e.g., as hard-coded relationships), rather than being defined in part by a computing device based on training data (e.g., as in the case of machine learning models). Such an approach may stand in contrast to the process by which ONN 414 is trained. Some examples of quantities that may be computed by signal processor 424 using the predetermined algorithms or equations include the distance between sensor system 400 and environment 402, reflectivity of environment 402, and/or pulse width of reflection 410B as represented in waveform 422. Additionally, such quantities may be computed by signal processor 424 electronically, rather than optically as is the case with ONN 414.

The system of FIG. 4A may further include application-specific ML models 430 - 434 ("ML models 430 - 434") each configured to perform corresponding operations related to detection and/or classification of physical features within environment 402 and/or other operations related to navigation of the autonomous vehicle. One or more of ML models 430 - 434 may constitute, and may thus be referred to as, a feature detector. Each of ML models 430 - 434 may be configured to receive as input and operate on map 426. ML models 430 - 434 may be implemented as software instructions executable by a processor (e.g., processor 113), as programmable circuitry (e.g., FPGA), as purpose-built circuitry (e.g., ASIC), or a combination thereof. ML models 430 - 434 may be configured to determine and/or classify, based on map 426, one or more physical features within the environment.

For example, ML models 430 - 434 may be configured to identify pedestrians, traffic signals and signs, roadways, vegetation, and other environmental features such as mailboxes, benches, garbage cans, sidewalks, and/or any other object within environment 402 that may be of interest to the operation of the autonomous vehicle. As another example, ML models 430 - 434 may be configured to determine that a physical feature constitutes an occlusion or an impediment that prevents sensor system 400 from viewing and/or acquiring data about one or more other objects or physical features disposed behind the occlusion or impediment. As a further example, ML models 430 - 434 also may, based on the detected physical features, plan a trajectory that defines at least a path and velocity for the vehicle to follow, and/or predict the trajectories of other mobile occupants of the environment.

ML models 416 - 420 may utilize embedding vector 416B, as represented in map 426, to operate more accurately and/or perform operations that would not be performable without the additional information represented by embedding vector 416B. For example, ML models 430 - 434 may rely on the information contained in embedding vector 416B to detect physical features, plan the vehicle trajectory, and perform other operations related to vehicle navigation. Thus, ML models 430 - 434 take into account not only information that can be calculated by signal processor 424 by applying predetermined equations to waveform 422, but also the other information stored in reflection 410A and represented by embedding vector 416B. Accordingly, the system of FIG. 4A may be less wasteful of return pulse information than other systems that do not utilize ONN 414.

In some implementations, ML models 430 - 434 and ONN 414 may be trained independently. For example, ONN 414 may be determined first, and ML models 430 - 434 may be subsequently trained to utilize the embedding vectors generated by ONN 414 to accurately accomplish their respective tasks. In other implementations, one or more of ML models 430 - 434 may be co-trained with ONN 414. For example, ONN 414 may be trained to map properties of reflection 410A to a vector space of embedding vector 416B while ML model 430 is simultaneously trained to utilize embedding vector 416B to, for example, detect smoke within the environment.

ML model 430 may thus provide an objective metric of whether embedding vector 416B is useful in performing the specific task of ML model 430 (e.g., smoke detection). Parameters of ONN 414 and of ML model 430 may be iteratively adjusted until smoke can be successfully detected within sample environments that neither model has previously trained on.

ONN 414 may be trained such that embedding vector 416B is usable and useful for multiple different and distinct tasks. Namely, the values of embedding vector 416B may be usable and useful for each of the tasks carried out by ML models 430 - 434 (e.g., distinguish between environments that do and do not contain smoke, determine whether an object does or does not constitute vegetation). For example, as ONN 414 is co-trained with a larger number of ML models, the values of the embedding vectors may come to more accurately and efficiently represent the physical characteristics used by the ML models. Thus, the specific ML models used in co-training with ONN 414 may, at least in part, define the physical properties indicated by the different dimensions of embedding vector 416B.

In some cases, ONN 414 may be trained such that the information of embedding vector 416B is not redundant with the information that signal processor 424 is configured to compute using waveform 422. For example, since ML models 430 - 434 may utilize information determined by signal processor 424 based on waveform 422, when ONN 414 is co-trained with one or more of ML models 430 - 434, redundancy may be reduced and/or eliminated by the training process.

IV. Example Embedding Vector

Figure 4B:
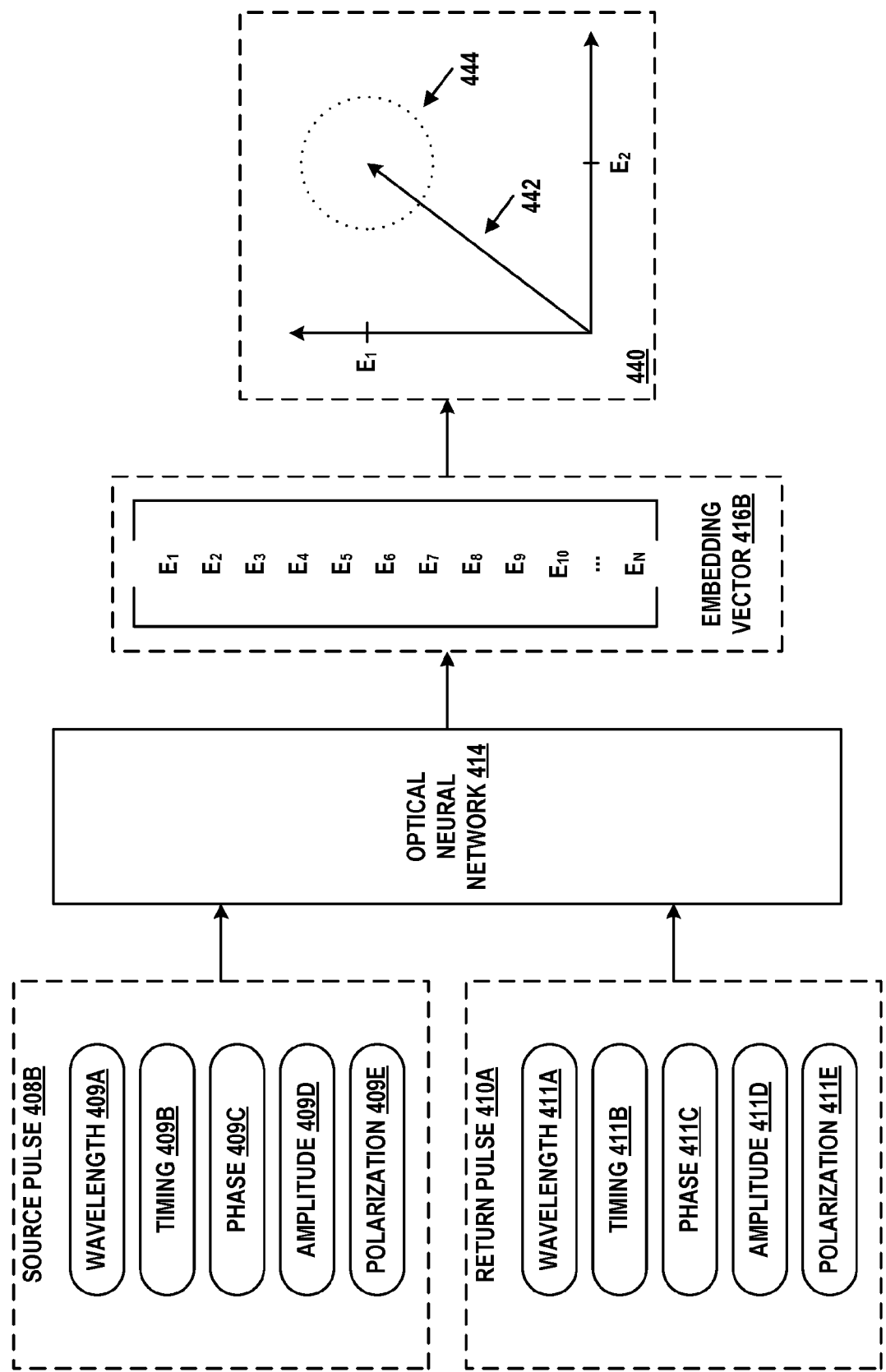
FIG. 4B illustrates an embedding vector, in accordance with example embodiments.

FIG. 4B illustrates additional details regarding ONN 414 and embedding vector 416B. Embedding vector 416B may include a plurality of values $E_1$ - $E_N$ (i.e., $E_1$, $E_2$, $E_3$, $E_4$, $E_5$, $E_6$, $E_7$, $E_8$, $E_9$, and $E_{10}$ through $E_N$) that represent, in an N-dimensional vector space, properties of reflection 410A, and thus physical characteristics of a corresponding point in the environment. Each of values $E_1$ - $E_N$ may represent a portion of the information contained in return pulse (i.e., reflection) 410A. Because return pulse 410A was reflected from a particular point in environment 402, the information may represent the physical characteristics of the particular point. The information may be stored or encoded in one or more of wavelength 411A, timing 411B, phase 411C, amplitude 411D, and/or polarization 411E of return pulse 410A. In some implementations, these properties of return pulse 410A may be measured and analyzed by ONN 414 in relation to one or more of wavelength 409A, timing 409B, phase 409C, amplitude 409D, and/or polarization 409E of source pulse 408B.

Thus, the embedding implemented by ONN 414 is a mathematical transformation that transforms the properties of return pulse 410A and/or source pulse 408B (which can be said to define an electromagnetic wave space) into the N-dimensional space (e.g., vector space) defined by embedding vector 416B. In some implementations, the model defined by ONN 414 may be configured to (i) preserve information indicative of physical characteristics of points in the environment and (ii) discards information that is not indicative of these physical characteristics.

In some cases, some of values $E_1$ - $E_N$ may be human-interpretable. That is, some of the values may provide explicit metrics of corresponding physical properties of the respective point within environment 402. In other cases, values $E_1$ - $E_N$ might not be human interpretable, but may nevertheless be interpretable by, for example, application-specific models 430 - 434 and be used in detecting various physical features within the environment. Thus, while values $E_1$ - $E_N$ might not themselves be human-interpretable, values $E_1$ - $E_N$ may be combined, transformed, and/or otherwise processed by further models and/or algorithms to generate human-interpretable outputs.

ONN 414 may be defined empirically through training based on a plurality of sample return pulses that represent a plurality of sample points in a plurality of sample environments with known physical characteristics/properties. Thus, ONN 414 may be learned from examples, rather than being predetermined by a programmer. Accordingly, ONN 414 may be configured to represent, through embedding vector 416B, physical characteristics that might not be determinable (e.g., entirely, or under certain constraints) by signal processor 424 based on waveform 422 by using predetermined expressions or equations.

Specifically, while signal processor 424 may rely on several key characteristics of waveform 422 (e.g., peak time, peak height, pulse width, etc.) in determining some physical properties of the points within environment 402, signal processor 424 might not utilize all the information contained in reflection 410. Signal processor 424 might not determine certain physical properties represented by reflection 410 and/or waveform 422 for a number of reasons.

In some cases, an algorithm or equation that allows for the calculation of a value associated with a particular physical property might not be known. For example, it might not be explicitly known what aspects of waveform 422 represent the particular physical property. In other cases, calculating the value associated with the particular physical property might be computationally expensive and thus undesirable or infeasible under certain resource constraints (e.g., processing time, memory, etc.), even if the algorithm or equation therefor is known.

ONN 414, on the other hand, may be able to extract from return pulse 410A at least a portion of the information that is not extracted therefrom by signal processor 424 using predetermined equations or expressions. Further, because ONN 414 determines embedding vector 416B based on return pulse 410A directly, rather than indirectly based on waveform 422, ONN 414 may allow for generation of embedding vector 416B that includes information which would otherwise be lost during sampling of return pulse 410A to generate waveform 422.

Values $E_1$ - $E_N$ may be used to determine the similarity of the physical properties of two different points. Namely, a distance between the corresponding embedding vectors in the N-dimensional space of the two different points (i.e., points in physical environment 402, as represented by map 426) may be indicative of a similarity between the properties of the two different points. For example, when the distance is small, the physical properties of the two points may be more similar than when the distance is large. A subset of the values of the vectors may be graphed to illustrate the degree of similarity between the physical properties of the two different points. To that end, FIG. 4B illustrates graph 440 of values $E_1$ and $E_2$ of embedding vector 416B plotted along the horizontal and vertical axis, respectively.

Other vectors falling within threshold 444 of graphical representation 442 of embedding vector 416B may be considered similar in that they represent the return pulses corresponding to points that have similar underlying physical properties. Notably, although graph 440 shows only two dimensions for simplicity of illustration, the concepts herein discussed may be expanded to N-dimensions. For example, in the case of three dimensions, threshold 444 may be represented graphically as a sphere rather than a circle. In one example, the distance between two vectors may be the Euclidean distance. In another example, the distance between the two vectors may be the cosine distance or another measure of distance. Thus, points having similar physical properties may generate return pulses that, when embedded in the N-dimensional space defined by ONN 414, fall within a threshold distance of one another.

V. Example Optical Neural Network

Figure 4C:
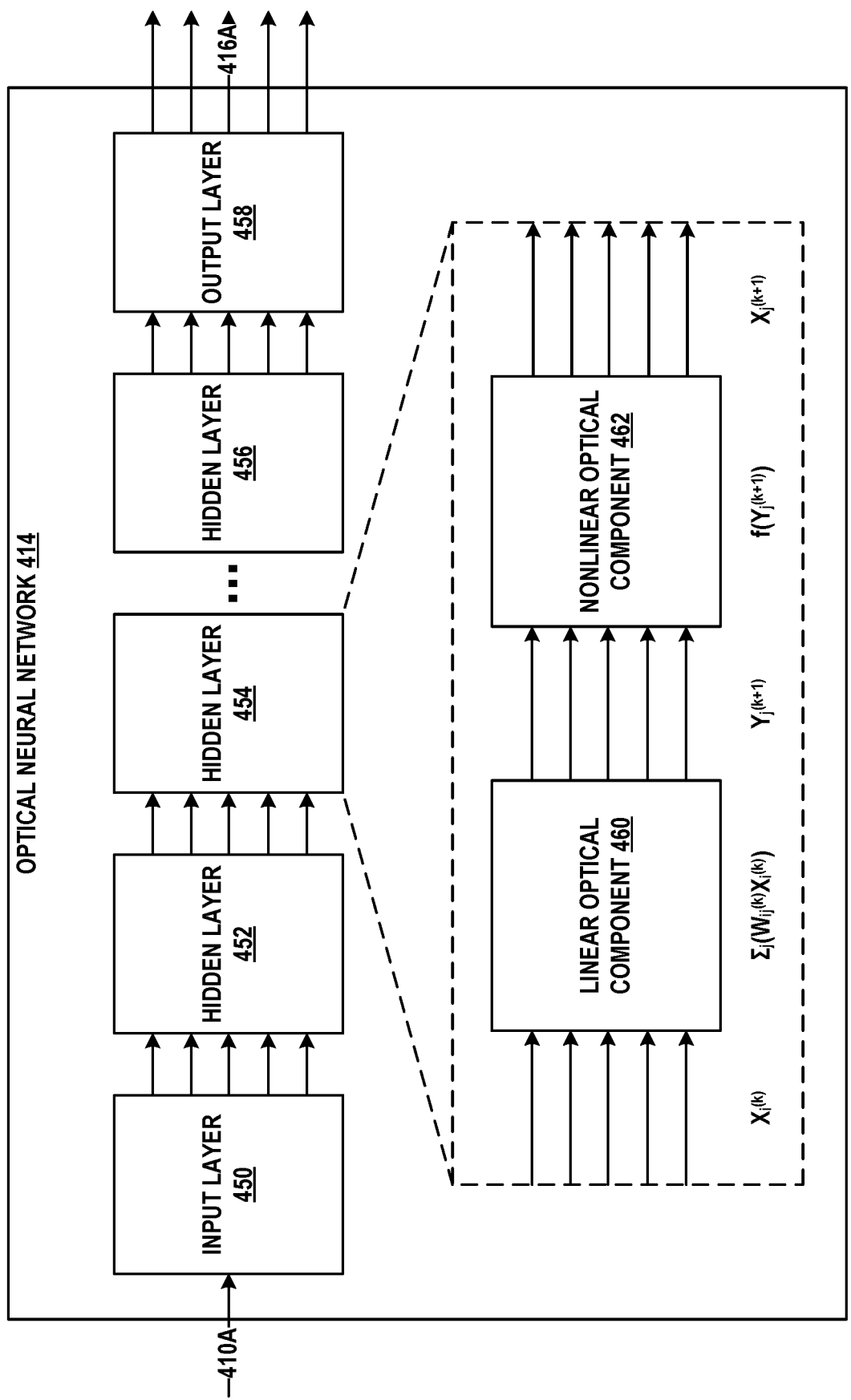
FIG. 4C illustrates an optical neural network, in accordance with example embodiments.

FIG. 4C illustrates an example structure of ONN 414. Specifically, ONN 414 may include input layer 450, hidden layers 452 and 454 through 456 (i.e., hidden layers 452 - 456), and output layer 458. Input layer 450 may be configured to receive reflection 410A as input and expand reflection 410A to span an area of hidden layer 452 such that reflection 410A is incident on each neuron in hidden layer 452. Thus, in one example, input layer 450 may be implemented as a beam expander or a 1-to-M signal splitter, where M is the number of neurons in hidden layer 452. Reflection 410A may propagate through and undergo processing by hidden layers 452 - 456 and output layer 458 until it emerges as optical embedding vector 416A at the output at output layer 458.

Each of hidden layers 452 - 456 and output layer 458 may include linear optical component 460 and nonlinear optical component 462. Specifically, linear optical component 460 and nonlinear optical component 462 may define the properties of the neurons that make up a particular layer of ONN 414. Linear optical component 460 may be configured to compute, for each neuron in the layer which it defines, a weighted sum of outputs of neurons in a preceding layer and may thus define the weights applied to each of the outputs of these neurons from the preceding layer. Nonlinear optical component 462 may be configured to apply an activation function to the output of linear optical component 460.

Thus, when the output of kth layer is $X_i^{(k)}$, linear optical component 460 of the (k+1)th layer may compute the sum $Y_j^{(k+1)} = \Sigma_j(W_{ij}^{(k)}X_i^{(k)})$, where the index i represents the ith neuron in the kth layer, where the index j represents the jth neuron in the (k+1)th layer, and the matrix $W_{ij}^{(k)}$ represents the weights associated with connections between the ith neuron in the kth layer and the jth neuron in the (k+1)th layer. Nonlinear optical component 462 may, in turn, be configured to compute $f(Y_j^{(k+1)}) = X_j^{(k+1)}$, where f represents the nonlinear function implemented by component 462 (e.g., sigmoid, tanh, ReLu, etc.). Accordingly, ONN 414 may replicate with optical components the operations that would otherwise be performed by electronic hardware in a conventional neural network implementation.

Linear optical component 460 may be implemented as, for example, one or more of a spatial light modulator (SLM), a diffractive surface comprising a plurality of diffractive elements, a network of photonic crystals, an array of ring resonators, a plurality of interconnected Mach-Zehnder interferometers, or a multimode interferometer, among other optical components. Similarly, nonlinear optical component 462 may be implemented as one or more of an array of saturable absorbers, optically-coupled atoms or atom-like systems, an array of bi-stable optical switches, or an array of ring resonators, among other optical components.

Alternatively, in some implementations, nonlinear optical component 462 may be replaced by an electronic component configured to apply the activation function electronically, rather than optically. For example, the output of linear optical component 460 may be measured by an array of electromagnetic detectors, the activation function may be applied to these measurements by way of electronic hardware, and an output of the nonlinear component may be generated by an array of electromagnetic emitters.

Further, each of linear optical component 460 and nonlinear optical component 462 may be electrically-controllable, optically-controllable, fixed, or a combination thereof. When a particular component is controllable, the corresponding portion of ONN 414 may be reprogrammed and/or retrained over time as new training data becomes available. Such retraining may be performed without physical modifications to the particular component. On the other hand, when a given component is fixed, the corresponding portion of ONN 414 might not be reprogrammed and/or retrained without making physical modifications to the given component. For example, the given component may be remanufactured with different parameters to apply different weights or activation functions, and may be physically replaced in ONN 414 to take effect. Such fixed components may be trained using simulations of ONN 414.

VI. Example ONN Training

In some cases, ONN 414 may be trained in a manner analogous to neural networks implemented in software and/or hardware. Specifically, the parameters of ONN 414 may be determined by training an electronic neural network based on training data. ONN 414 may subsequently be manufactured and/or programmed to optically implement the trained electronic neural network such that these two networks carry out the same linear and nonlinear operations.

The training data may include a plurality of return pulses (represented electronically, as in waveform 422, rather than optically) each associated with a corresponding set of known physical properties. The specific physical properties contained in the training data may, at least in part, define the information that ONN 414 is trained to embed. The physical properties represented in the training data may include, for example, the physical properties represented by vector attributes 520 in FIG. 5. This type of training may be used for components of ONN 414 that are fixed (i.e., having optical properties that are not electronically or optically controllable), and are thus trained before being physically implemented. Further, this type of training may configure ONN 414 to embed any information that is contained in the electronic representation of the electromagnetic return pulse.

Depending on, for example, the sampling rate at which the electronic waveform is generated based on the electromagnetic return pulse, some information contained in the return pulse may be lost during sampling. ONN 414 may be configured to also embed any information that would be lost during the conversion of the electromagnetic signal to an electrical signal by training directly on electromagnetic return pulses. Specifically, ONN 414 may be trained on electromagnetic return pulses reflected from points in an environment with known physical properties. In one example, the physical properties of the environment may be known by creating a testing/calibration environment where the physical properties are controlled by the environment's constructor.

In another example, physical properties of an uncontrolled environment (e.g., real-world conditions) may be known as a result of being measured by other components of the system (e.g., signal processor 424 and/or other electronic embedding models based on waveform 422). For example, a vehicle may be configured to measure the physical properties as it drives around on streets and ONN 414 may use these measurements in combination with return pulse 410A as training data. Thus, electronic-based techniques and systems for measuring physical properties of points in the environment may operate to generate training data for ONN 414 in real time during operation of sensor system 400. Such electromagnetic waveform-based training may necessitate that ONN 414 include at least some electrically-controllable or optically-controllable components that can be adjusted to change at least some parameters of ONN 414.

In other implementations, ONN 414 may first be implemented based on an electronic neural network trained using electronic/sampled return pulses. ONN 414 may subsequently be refined and/or adjusted by training on electromagnetic return pulses directly, as discussed above, in controlled and/or uncontrolled environments. Such adjustments made to ONN 414 during the subsequent electromagnetic waveform-based training may allow embedding vector 416A to include any information that might otherwise be lost during sampling of return pulse 410A. Each training approach may be carried out by utilizing one or more of ML models 430 - 434, as discussed above, to provide an objective metric of how well the generated embedding represents the physical properties of points in the environment. As ONN 414 is re-trained over time (e.g., using electromagnetic waveform data), ML models 430 - 434 may also be re-trained to utilize any additional information added to embedding vector 416A in view of the re-training.

VII. Example Attribute Mapping

Figure 5:
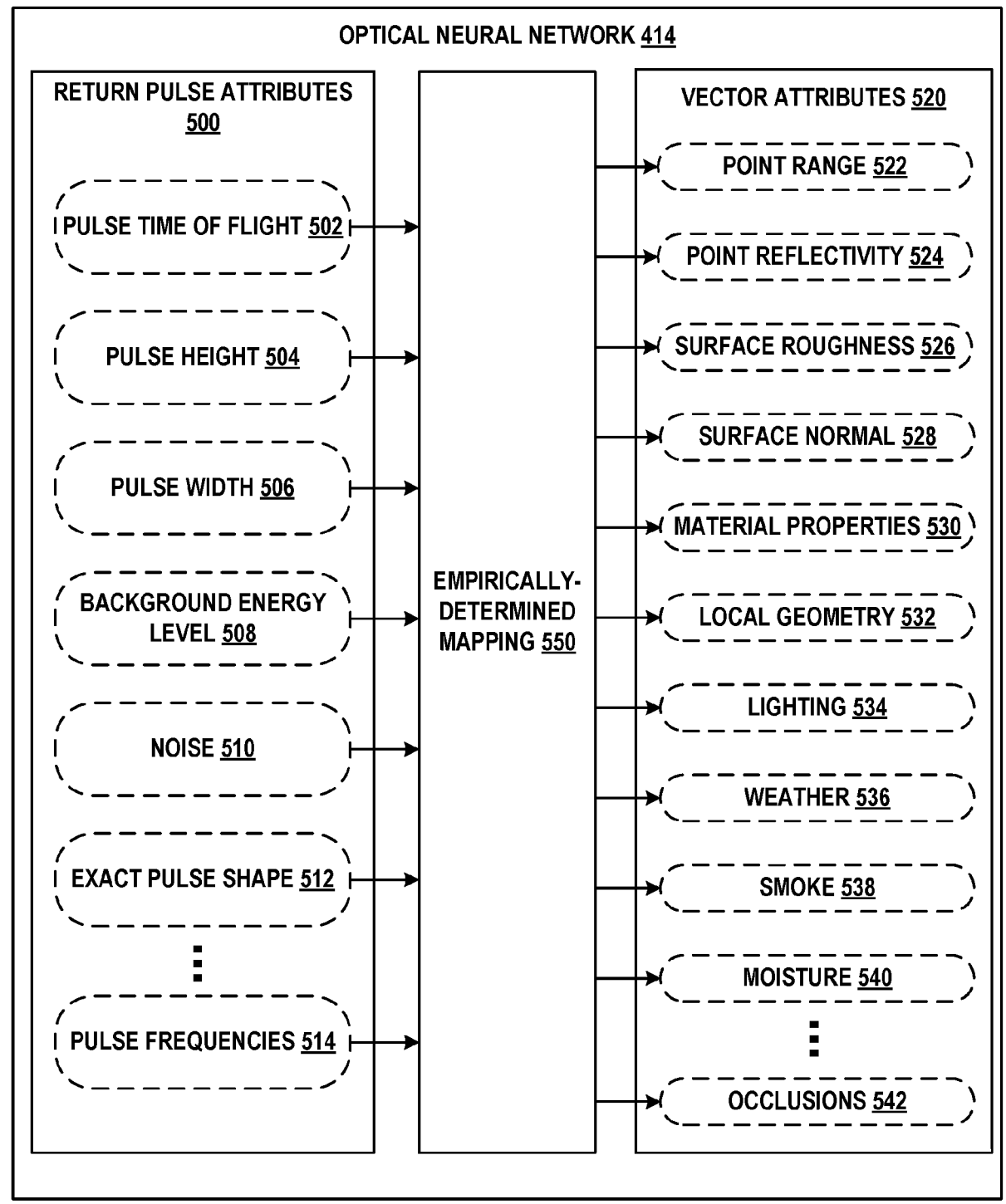
FIG. 5 illustrates a mapping, in accordance with example embodiments.

FIG. 5 illustrates examples of the physical characteristics (i.e., properties) that may be determined by ONN 414 for points and surfaces within environment 402. ONN 414 may be trained to determine vector attributes 520 based on return pulse attributes 500 by way of empirically-determined mapping 550. Each of return pulse attributes 500 may be associated with a corresponding pattern of properties 411A - 411E of return pulse 410A and/or properties 409A - 409E of source pulse 408B. Mapping 550 may be defined by the structure and/or programming of components of ONN 414 following training.

Return pulse attributes 500 may include, for example, pulse time of flight 502, pulse height 504, pulse width 506, background energy level 508, noise 510, exact pulse shape 512, and pulse frequencies 514, among other attributes. Vector attributes 520 may represent point range 522, point reflectivity 524, surface roughness 526, surface normal 528, material properties 530 of the respective point represented by the return pulse, local geometry 532 associated with the respective point (e.g., local surface normal of the point), lighting 534 in the environment, weather conditions 536 in the environment, presence of smoke 538 (e.g., exhaust, smog, or other combustion gases) in the environment, presence of moisture 540 (e.g., fog, rain, or condensation) between sensor system 400 and the respective point, and presence of any occlusions 542 (e.g., penetrable or semi-penetrable materials between sensor system 400 and the respective point, or other impediments), among other aspects.

For example, mapping 550 may indicate that pulse time of flight 502 is related to point range 522 (i.e., the distance between the respective point and sensor system 400). Specifically, pulse time of flight 502 may be the difference in time between detection of the peak of the return pulse and transmission of its corresponding source light pulse. Thus, mapping 550 may compute point range 522 based on the product of (i) the speed of light in air with (ii) pulse time of flight 502.

Similarly, point reflectivity 524 and pulse height 504 may be related by way of mapping 550. For example, point reflectivity 524 may be defined by the quotient of (i) pulse height 504 of the return pulse and (ii) a pulse height of the corresponding source light pulse. As another example, point reflectivity 524 may be defined by the quotient of (i) a first integral of the return pulse and (ii) a second integral of the corresponding source light pulse. In other words, point reflectivity 524 may indicate the fraction of the source light pulse that was reflected back at sensor system 400, as represented by pulse height 504 or by the integral of the pulse.

In a further example, pulse width 506 (e.g., full width at half of pulse peak) may be used to estimate surface roughness 526. Low pulse width 506 may be indicative of smooth surfaces that do not cause a large degree of photon scattering. On the other hand, high pulse width 506 may be indicative of rough surfaces that cause a large degree (i.e., an amount that exceeds a predetermined threshold) of photon scattering, resulting in multiple photon return paths. Pulse width 506 may thus be proportional to surface roughness.

In addition to determining the attributes of individual points, ONN 414 may also be configured to determine attributes of surfaces underlying groups of multiple points. For example, when sensor system 400 simultaneously projects multiple pulses or when a single pulse spans a sufficiently large surface within environment 402, ONN 414 may be configured to determine surface normal 528 for surfaces within environment 402.

In some cases, one of vector values $E_1$ - $E_N$ of embedding vector 416B may represent a corresponding one of vector attributes 520 (e.g., $E_5$ may indicate the presence of smoke 538). In such a case, this vector value may be considered human-interpretable. In other cases, vector values $E_1$ - $E_N$ might not directly represent any of vector attributes 520. Instead, one or more of vector values $E_1$ - $E_N$ may need to be combined and/or mathematically transformed (e.g., by application-specific ML models 430 - 434) in order to provide a direct measure of a corresponding one or more of vector attributes 520. Thus, for example, vector values $E_1$, $E_6$, and $E_7$ may be used by ML model 432 to determine the amount of moisture 540 present between sensor system 400 and the respective point within the environment. In such cases, these vector values might not be considered human-interpretable. Nevertheless, vector values $E_1$ - $E_N$ may each be machine-interpretable and thus usable for various operations of an autonomous vehicle.

Some of vector attributes 520 may alternatively or additionally be determinable by signal processor 424 based on waveform 422 by using predetermined algorithms and/or expressions. For example, point range 522, point reflectivity 524, surface roughness 526, and/or surface normal 528 may be computable by signal processor 424 using predetermined algorithms or expressions.

VIII. Example Cross-Sensor Feature Detection

Figure 6:
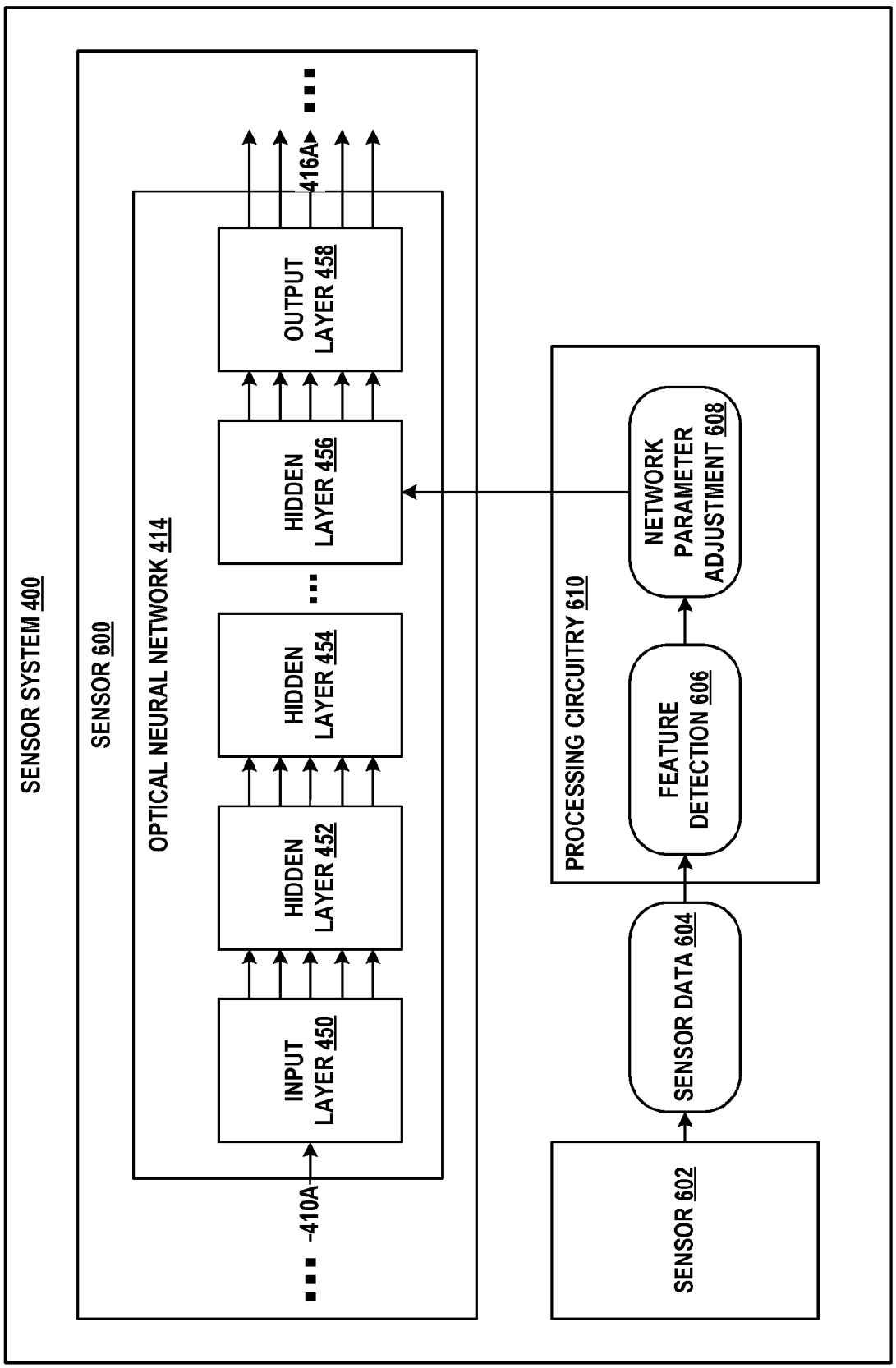
FIG. 6 illustrates adjustments to parameters of an optical neural network, in accordance with example embodiments.

FIG. 6 illustrates an alternative embodiment of sensor system 400 in which multiple sensors may collaborate with one another in measuring characteristics of the environment. Sensor system 400 may include first sensor 600 that utilizes ONN 414, as shown in and discussed with respect to FIG. 4A, second sensor 602, and processing circuitry 610. In some cases, first sensor 600 may be of a different type than second sensor 602 (e.g., LIDAR and RADAR, respectively).

Second sensor 602 may be configured to generate sensor data 604. Processing circuitry 610 may be configured to receive sensor data 604 and detect therein a feature or property of interest, as indicated by block 606. The feature may be, for example, a vehicle, a pedestrian, smoke, moisture, or vegetation, among other possibilities. Similarly, the detected properties may include any of the properties indicated by vector attributes 520 in FIG. 5, among other possibilities. Based on detection of the feature or property of interest, processing circuitry 610 may be configured to generate network parameter adjustment 608 to one or more controllable parameters of ONN 414.

For example, when the detected feature of interest is a car, processing circuitry 610 may increase the weights or biases given to neurons configured to detect properties or portions of cars. In another example, when the detected feature of interest is the presence of smoke in the environment, processing circuitry 610 may increase the weights or biases given to neurons configured to generate values of embedding vector 416A that indicate smoke. To that end, processing circuitry 610 may store or have access to information that maps different properties or features to portions and/or layers of ONN 414 associated with detections of these properties or features. Such information may be obtained following and/or as part of the training process of ONN 414.

Adjustment of parameters of ONN 414 may be temporally and spatially synchronized such that the adjustment is made at a time when sensor 600 is expected to observe the feature detected within sensor data 604. Once a given feature has been observed by sensor 600, processing circuitry 610 may adjust the parameters back to their original values. In cases where sensor 602 utilizes another instance of ONN 414, detections by sensor 600 may be used to adjust the parameters of the other instance of ONN 414.

IX. Additional Example Operations

Figure 7:
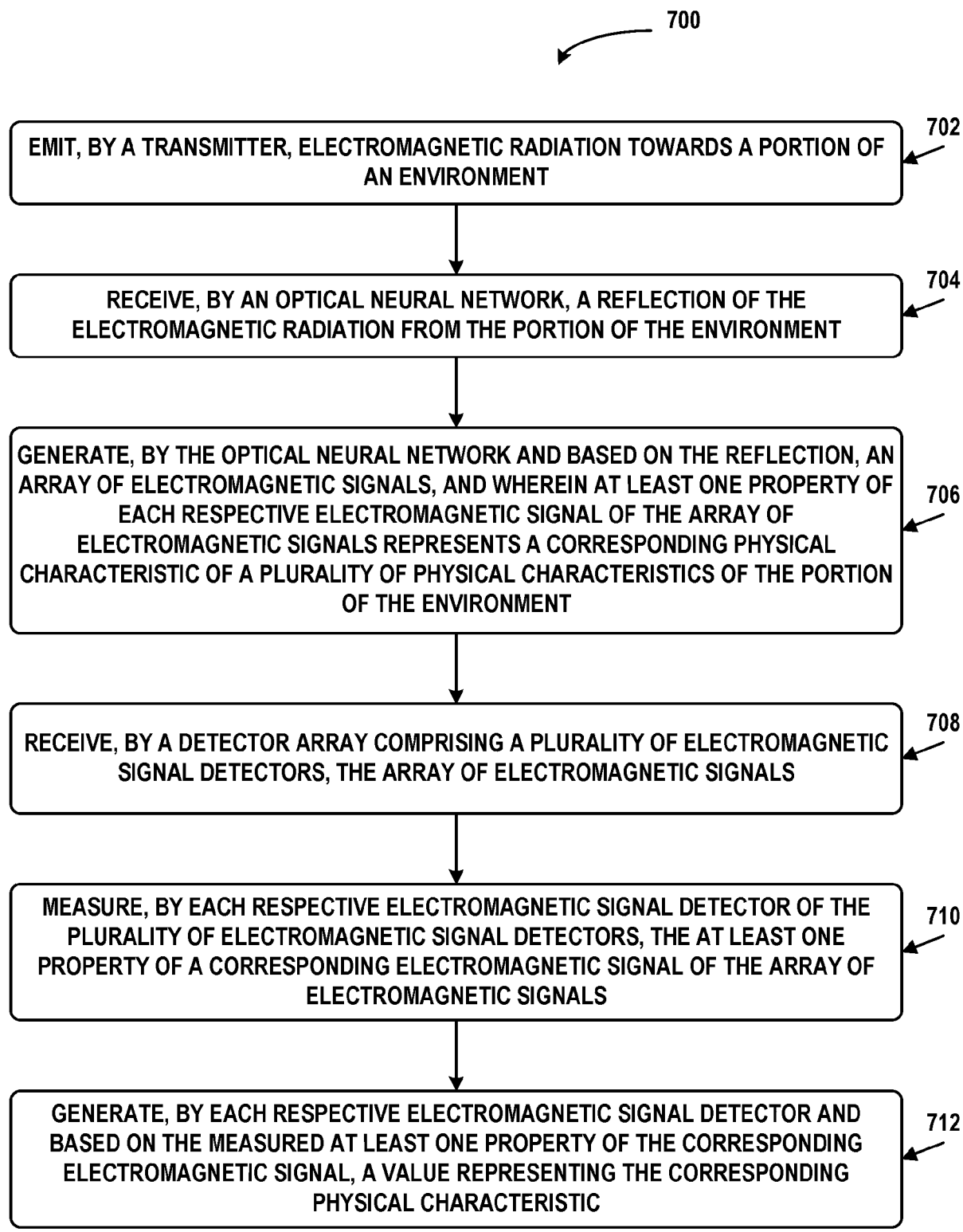
FIG. 7 illustrates a flow chart, in accordance with example embodiments.

FIG. 7 illustrates flow chart 700 of operations related to generating an embedding of a sensor signal. The operations may be carried out by components of vehicle 100 or 200, or sensor system 400, among other possibilities. The embodiments of FIG. 7 may be simplified by the removal of any one or more of the features shown therein. Further, these embodiments may be combined with features, aspects, and/or implementations of any of the previous figures or otherwise described herein.

Block 702 may involve emitting, by a transmitter, electromagnetic radiation towards a portion of an environment.

Block 704 may involve receiving, by an ONN, a reflection of the electromagnetic radiation from the portion of the environment.

Block 706 may involve generating, by the ONN and based on the reflection, an array of electromagnetic signals. At least one property of each respective electromagnetic signal of the array of electromagnetic signals may represent a corresponding physical characteristic of a plurality of physical characteristics of the portion of the environment.

Block 708 may involve receiving, by a detector array that includes a plurality of electromagnetic signal detectors, the array of electromagnetic signals.

Block 710 may involve measuring, by each respective electromagnetic signal detector of the plurality of electromagnetic signal detectors, the at least one property of a corresponding electromagnetic signal of the array of electromagnetic signals.

Block 712 may involve generating, by each respective electromagnetic signal detector and based on the measured at least one property of the corresponding electromagnetic signal, a value representing the corresponding physical characteristic.

In some embodiments, the array of electromagnetic signals may comprise an embedding of the reflection.

In some embodiments, a feature detector may be communicatively coupled to the detector array. The feature detector may be configured to detect or classify a physical feature within the environment based on one or more sets of values representing the plurality of physical characteristics of one or more portions of the environment.

In some embodiments, the array of electromagnetic signals may include an output array of electromagnetic signals. The detector array may be configured to receive the output array of electromagnetic signals. The ONN may include an input layer configured to receive the reflection and generate an input array of optical signals based on the reflection. The ONN may also include one or more hidden layers optically connected to the input layer and configured to generate the output array of electromagnetic signals based on the input array of optical signals. Each respective hidden layer of the one or more hidden layers may include (i) a first optical component configured to receive a preceding array of electromagnetic signals from a preceding layer of the ONN and perform a linear transformation of the preceding array of electromagnetic signals into an intermediate array of electromagnetic signals and (ii) a second optical component configured to receive the intermediate array of electromagnetic signals from the first optical component and perform a non-linear transformation of the intermediate array of electromagnetic signals.

In some embodiments, the first optical component may include one or more of (i) a spatial light modulator, (ii) a diffractive surface comprising a plurality of diffractive elements, (iii) a network of photonic crystals, (iv) an array of ring resonators, (v) a plurality of interconnected Mach-Zehnder interferometers, or (vi) a multimode interferometer. The second optical component may include one or more of (i) an array of saturable absorbers, (ii) an array of bi-stable optical switches, (iii) an array of ring resonators, (iv) one or more optically-coupled atoms or atom-like systems.

In some embodiments, the transmitter, the ONN, and the detector array may form a first sensor of a first type. Additionally, the sensor system may include a second sensor of a second type different from the first type and processing circuitry configured to perform operations. The operations may include receiving, from the second sensor, sensor data indicative of a feature of interest within the environment. The operations may also include detecting the feature of interest within the sensor data. The operations may further include adjusting one or more parameters of a portion of the ONN based on detecting the feature of interest. The portion of the ONN may be associated with detection of at least one physical characteristic of the feature of interest based on the reflection.

In some embodiments, the ONN may define a relationship between characteristics of the reflection and the plurality of physical characteristics of the portion of the environment.

In some embodiments, the relationship may be determined such that, when physical characteristics of a first portion of the environment have at least a threshold degree of similarity to physical characteristics of a second portion of the environment, a first embedding vector comprising values representing the plurality of physical characteristics corresponding to the first portion may be within a threshold distance of a second embedding vector comprising values representing the plurality of physical characteristics corresponding to the second portion.

In some embodiments, a beam splitter may be configured to (i) direct a first portion of the electromagnetic radiation towards the portion of the environment and (ii) direct a second portion of the electromagnetic radiation towards the ONN. The ONN may be further configured to receive the second portion of the electromagnetic radiation from the beam splitter and generate the array of electromagnetic signals further based on the second portion of the electromagnetic radiation.

In some embodiments, the sensor system may also include an additional electromagnetic signal detector and a beam splitter configured to (i) direct a first portion of the reflection towards the additional electromagnetic signal detector and (ii) direct a second portion of the reflection towards the ONN. The additional electromagnetic signal detector may be configured to generate a waveform representing the first portion of the reflection. The sensor system may additionally include a signal processor communicatively coupled to the additional electromagnetic signal detector and configured to determine, based on the waveform, an additional value representing a particular physical characteristic of the portion of the environment. The additional value may be computed using a predetermined algorithm that defines a relationship between one or more characteristics of the waveform and the particular physical characteristic.

In some embodiments, the particular physical characteristic might not be represented by the array of electromagnetic signals.

In some embodiments, at least a portion of the ONN may be electrically programmable to adjust one or more parameters of the ONN.

In some embodiments, the plurality of physical characteristics may include two or more of: (i) a distance between the sensor system and the portion of the environment, (ii) a reflectivity of the portion of the environment, (iii) a surface roughness of the portion of the environment, (iv) a surface normal of the portion of the environment, (v) material properties of the portion of the environment, (vi) lighting conditions between the sensor system and the portion of the environment, (vii) weather conditions between the sensor system and the portion of the environment, (viii) presence of smoke between the sensor system and the portion of the environment, (ix) presence of moisture between the sensor system and the portion of the environment, or (x) an occlusion disposed between the sensor system and the portion of the environment.

In some embodiments, the sensor system may include a light detection and ranging (LIDAR) system. The transmitter may include an optical transmitter. The array of electromagnetic signals may include an array of optical signals. The detector array may include a plurality of optical signal detectors.

In some embodiments, the sensor system may include a radio detection and ranging (RADAR) system. The transmitter may include one or more radio transmit antennas. The array of electromagnetic signals may include an array of radio signals. The detector array may include a plurality of radio receive antennas.

In some embodiments, the sensor system may include a camera device. The transmitter may include an optical illuminator, which, in some cases, may be omitted. The array of electromagnetic signals may include an array of optical signals. The detector array may include a plurality of optical signal detectors (e.g., an image sensor). In such an implementation, the ONN may be configured to generate an embedding vector that represents the entirety of the image captured by the camera, or generate a plurality of embeddings each corresponding to a different portion of the captured image.

In an alternative embodiment, the sensor system may include an ultrasonic sensor. The transmitter may include an ultrasonic transmitter configured to generate sound waves rather than electromagnetic radiation. The ONN may instead be implemented as a phononic neural network configured to process sound waves, rather than electromagnetic radiation. Similarly, the array of electromagnetic signals may instead be replaced by an array of ultrasonic signals. The detector array may include a plurality of ultrasonic signal detectors (e.g., an array of ultrasonic microphones). Such an ultrasonic sensor may function analogously to a RADAR device, but may transmit and receive ultrasonic signals rather than electromagnetic radiation.

Figure 8:
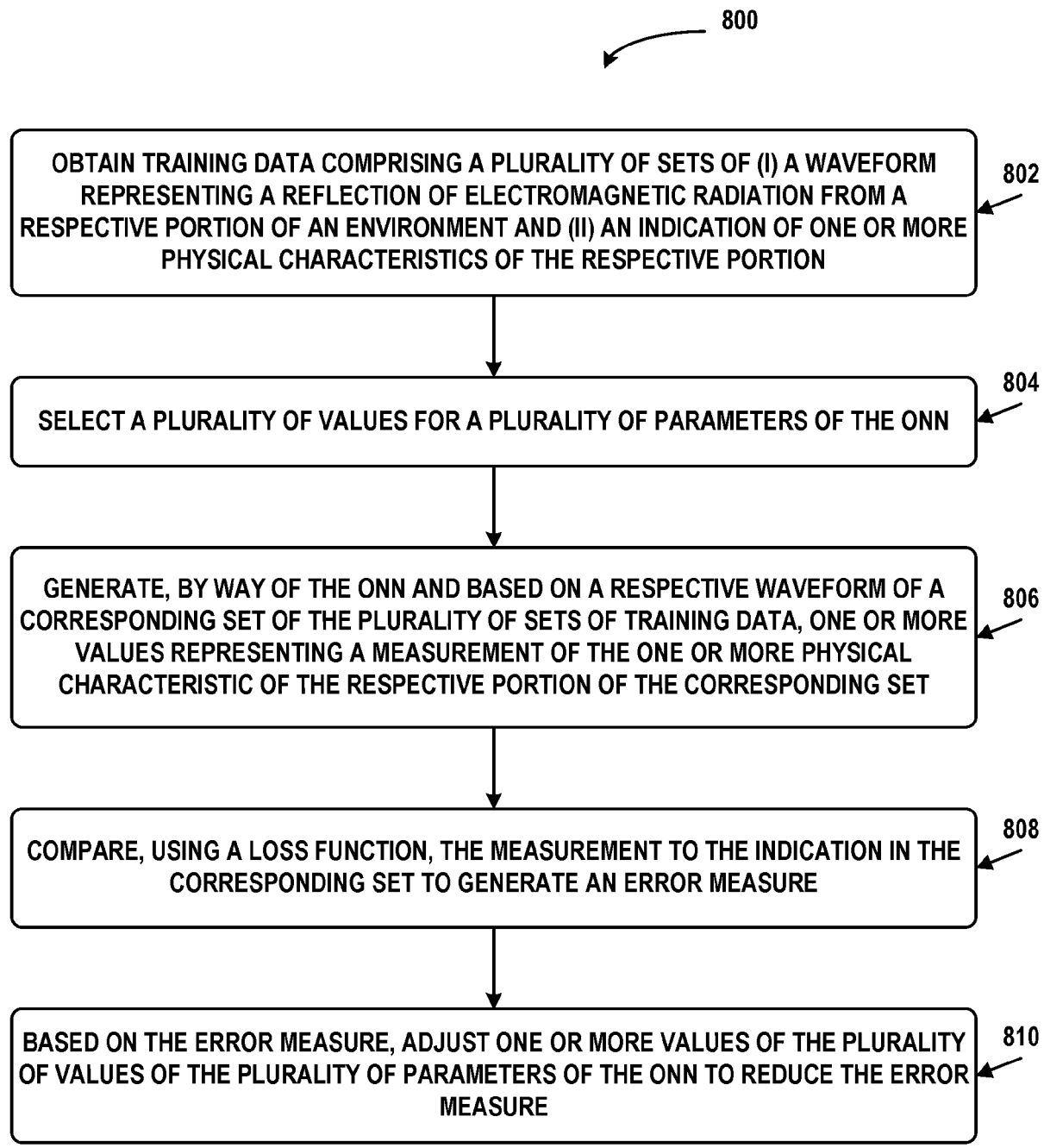
FIG. 8 illustrates a flow chart, in accordance with example embodiments.

FIG. 8 illustrates flow chart 800 of operations related to training of an ONN. The operations may be carried out by components of vehicle 100 or 200, or sensor system 400, among other possibilities. The embodiments of FIG. 8 may be simplified by the removal of any one or more of the features shown therein. Further, these embodiments may be combined with features, aspects, and/or implementations of any of the previous figures or otherwise described herein.

Block 802 may involve obtaining training data comprising a plurality of sets of (i) a waveform representing a reflection of electromagnetic radiation from a respective portion of an environment and (ii) an indication of one or more physical characteristics of the respective portion.

Block 804 may involve selecting a plurality of values for a plurality of parameters of the ONN.

Block 806 may involve generating, by way of the ONN and based on a respective waveform of a corresponding set of the plurality of sets of training data, one or more values representing a measurement of the one or more physical characteristic of the respective portion of the corresponding set.

Block 808 may involve comparing, using a loss function, the measurement to the indication in the corresponding set to generate an error measure.

Block 810 may involve based on the error measure, adjusting one or more values of the plurality of values of the plurality of parameters of the ONN to reduce the error measure.

In some embodiments, the ONN may be trained to generate an embedding that represents any physical features contained in the training data. That is, the specific physical characteristics of the respective portions represented in the training data by way of the indications may at least in part define the information that the ONN is trained to embed based on the return pulses. Thus, in some embodiments, the one or more physical characteristics represented by the training data may include one or more of the physical characteristics/properties represented by vector attributes 520 of FIG. 5.

In some embodiments, the waveform may include an electronic waveform that represents a sampling of the reflection of electromagnetic radiation. The one or more values may be generated by way of an electronic simulation of the ONN.

In some embodiments, the generating of the one or more values (block 806), comparing of the one or more values (block 808), and adjusting the one or more values (block 810) may be repeated until the error measure falls below a threshold error value. Based on the error measure falling below the threshold error value, a physical implementation of the ONN may be configured according to the one or more values generated by way of the electronic simulation of the ONN.

In some embodiments, the waveform may include an electromagnetic waveform that represents the reflection of electromagnetic radiation. The one or more values may be represented by at least one property of one or more electromagnetic signals generated by a physical implementation of the ONN.

In some embodiments, the one or more values may be generated by a detector array configured to receive the one or more electromagnetic signals. The detector array may include a plurality of electromagnetic signal detectors. Each respective electromagnetic signal detector of the plurality of electromagnetic signal detectors may be configured to (i) measure the at least one property of a corresponding electromagnetic signal of the one or more electromagnetic signals and (ii) generate, based on the measured at least one property of the corresponding electromagnetic signal, a corresponding value of the one or more values.

In some embodiments, the one or more values may define an embedding of the reflection.

In some embodiments, comparing the measurement to the indication may include processing a plurality of measurements associated with a subset of the plurality of sets by a feature detector configured to detect or classify a physical feature within the environment and comparing an output of the feature detector to the indication in the corresponding set to generate the error measure.

In some embodiments, obtaining the training data may include generating the plurality of sets by one or more signal processors configured to generate the indication of the one or more physical characteristics of the respective portion by calculating the indication based on the waveform representing the reflection of electromagnetic radiation from the respective portion. The environment may be an uncontrolled environment having physical characteristics that are not known prior to being calculated by the signal processor.

In some embodiments, the training data may be obtained from a controlled environment having physical characteristics that are known prior to being measured. The obtaining of the training data and the generating of the one or more values may be performed substantially in parallel.

In some embodiments, adjusting the one or more values of the plurality of values of the plurality of parameters of the ONN may include modifying one or more parameters of the plurality of parameters of the ONN electronically or optically.

In some embodiments, the one or more values are adjusted based on a gradient of the error measure (e.g., using a gradient descent algorithm).

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A sensor system comprising:
   a transmitter configured to emit electromagnetic radiation towards a portion of an environment;
   an optical neural network (ONN) configured to (i) receive a reflection of the electromagnetic radiation from the portion of the environment and (ii) generate an output array of electromagnetic signals, wherein at least one property of each respective electromagnetic signal of the output array of electromagnetic signals represents a corresponding physical characteristic of a plurality of physical characteristics of the portion of the environment, wherein the ONN comprises an input layer and one or more hidden layers optically connected to the input layer, wherein the input layer is configured to receive the reflection and generate an input array of electromagnetic signals based on the reflection, wherein the one or more hidden layers are configured to generate the output array of electromagnetic signals based on the input array of electromagnetic signals, and wherein each respective hidden layer of the one or more hidden layers comprises:
      a first optical component configured to receive a preceding array of electromagnetic signals from a preceding layer of the ONN and perform a linear transformation of the preceding array of electromagnetic signals to generate an intermediate array of electromagnetic signals; and
      a second optical component configured to receive the intermediate array of electromagnetic signals from the first optical component and perform a non-linear transformation of the intermediate array of electromagnetic signals; and
   a detector array comprising a plurality of electromagnetic signal detectors and configured to receive the output array of electromagnetic signals generated by the ONN, wherein each respective electromagnetic signal detector of the plurality of electromagnetic signal detectors is configured to (i) measure the at least one property of a corresponding electromagnetic signal of the output array of electromagnetic signals and (ii) generate, based on the measured at least one property of the corresponding electromagnetic signal, a value representing the corresponding physical characteristic.

2. The sensor system of claim 1, further comprising:
   a feature detector communicatively coupled to the detector array and configured to detect or classify a physical feature within the environment based on one or more sets of values representing the plurality of physical characteristics of one or more portions of the environment.

3. The sensor system of claim 1, wherein the first optical component comprises one or more of (i) a spatial light modulator, (ii) a diffractive surface comprising a plurality of diffractive elements, (iii) a network of photonic crystals, (iv) an array of ring resonators, (v) a plurality of interconnected Mach-Zehnder interferometers, or (vi) a multimode interferometer, and wherein the second optical component comprises one or more of (i) an array of saturable absorbers, (ii) an array of bi-stable optical switches, (iii) an array of ring resonators, or (iv) one or more optically-coupled atoms or atom-like systems.

4. The sensor system of claim 1, wherein the transmitter, the ONN, and the detector array form a first sensor of a first type, and wherein the sensor system further comprises:
   a second sensor of a second type different from the first type; and
   processing circuitry configured to perform operations comprising:
      receiving, from the second sensor, sensor data indicative of a feature of interest within the environment;
      detecting the feature of interest within the sensor data; and
      adjusting one or more parameters of a portion of the ONN based on detecting the feature of interest, wherein the portion of the ONN is associated with detection of at least one physical characteristic of the feature of interest based on the reflection.

5. The sensor system of claim 1, wherein the ONN defines a relationship between characteristics of the reflection and the plurality of physical characteristics of the portion of the environment.

6. The sensor system of claim 5, wherein the relationship is determined such that, when physical characteristics of a first portion of the environment have at least a threshold degree of similarity to physical characteristics of a second portion of the environment, a first embedding vector comprising values representing the plurality of physical characteristics corresponding to the first portion is within a threshold distance of a second embedding vector comprising values representing the plurality of physical characteristics corresponding to the second portion.

7. The sensor system of claim 1, further comprising:
   a beam splitter configured to (i) direct a first portion of the electromagnetic radiation towards the portion of the environment and (ii) direct a second portion of the electromagnetic radiation towards the ONN, wherein the ONN is further configured to receive the second portion of the electromagnetic radiation from the beam splitter and generate the output array of electromagnetic signals further based on the second portion of the electromagnetic radiation.

8. The sensor system of claim 1, further comprising:
   an additional electromagnetic signal detector;
   a beam splitter configured to (i) direct a first portion of the reflection towards the additional electromagnetic signal detector and (ii) direct a second portion of the reflection towards the ONN, wherein the additional electromagnetic signal detector is configured to generate a waveform representing the first portion of the reflection; and
   a signal processor communicatively coupled to the additional electromagnetic signal detector and configured to determine, based on the waveform, an additional value representing a particular physical characteristic of the portion of the environment, wherein the additional value is computed using a predetermined algorithm that defines a relationship between one or more characteristics of the waveform and the particular physical characteristic.

9. The sensor system of claim 8, wherein the particular physical characteristic is not represented by the output array of electromagnetic signals.

10. The sensor system of claim 1, wherein at least a portion of the ONN is electrically programmable to adjust one or more parameters of the ONN.

11. The sensor system of claim 1, wherein the plurality of physical characteristics comprise two or more of: (i) a distance between the sensor system and the portion of the environment, (ii) a reflectivity of the portion of the environment, (iii) a surface roughness of the portion of the environment, (iv) a surface normal of the portion of the environment, (v) material properties of the portion of the environment, (vi) lighting conditions between the sensor system and the portion of the environment, (vii) weather conditions between the sensor system and the portion of the environment, (viii) presence of smoke between the sensor system and the portion of the environment, (ix) presence of moisture between the sensor system and the portion of the environment, or (x) an occlusion disposed between the sensor system and the portion of the environment.

12. The sensor system of claim 1, wherein the sensor system comprises a light detection and ranging (LIDAR) system, wherein the transmitter comprises an optical transmitter, wherein the output array of electromagnetic signals comprises an array of optical signals, and wherein the detector array comprises a plurality of optical signal detectors.

13. The sensor system of claim 1, wherein the sensor system comprises a radio detection and ranging (RADAR) system, wherein the transmitter comprises one or more radio transmit antennas, wherein the output array of electromagnetic signals comprises an array of radio signals, and wherein the detector array comprises a plurality of radio receive antennas.

14. The sensor system of claim 1, wherein the output array of electromagnetic signals comprises an embedding of the reflection.

15. A method comprising:
emitting, by a transmitter, electromagnetic radiation towards a portion of an environment;
receiving, by an optical neural network (ONN), a reflection of the electromagnetic radiation from the portion of the environment;
generating, by the ONN and based on the reflection, an output array of electromagnetic signals, wherein the ONN comprises an input layer and one or more hidden layers optically connected to the input layer, wherein the input layer is configured to receive the reflection and generate an input array of electromagnetic signals based on the reflection, wherein the one or more hidden layers are configured to generate the output array of electromagnetic signals based on the input array of electromagnetic signals, wherein each respective hidden layer of the one or more hidden layers comprises: (i) a first optical component configured to receive a preceding array of electromagnetic signals from a preceding layer of the ONN and perform a linear transformation of the preceding array of electromagnetic signals to generate an intermediate array of electromagnetic signals, and (ii) a second optical component configured to receive the intermediate array of electromagnetic signals from the first optical component and perform a non-linear transformation of the intermediate array of electromagnetic signals, and wherein at least one property of each respective electromagnetic signal of the output array of electromagnetic signals represents a corresponding physical characteristic of a plurality of physical characteristics of the portion of the environment;
receiving, by a detector array comprising a plurality of electromagnetic signal detectors, the output array of electromagnetic signals generated by the ONN;
measuring, by each respective electromagnetic signal detector of the plurality of electromagnetic signal detectors, the at least one property of a corresponding electromagnetic signal of the output array of electromagnetic signals; and
generating, by each respective electromagnetic signal detector and based on the measured at least one property of the corresponding electromagnetic signal, a value representing the corresponding physical characteristic.

16. The method of claim 15, further comprising:
detecting or classifying a physical feature within the environment based on one or more sets of values representing the plurality of physical characteristics of one or more portions of the environment.

17. The method of claim 15, further comprising:
directing, by a beam splitter, a first portion of the electromagnetic radiation towards the portion of the environment;
directing, by the beam splitter, a second portion of the electromagnetic radiation towards the ONN;
receiving, by the ONN, the second portion of the electromagnetic radiation from the beam splitter; and
generating, by the ONN, the output array of electromagnetic signals further based on the second portion of the electromagnetic radiation.

18. The method of claim 15, wherein the output array of electromagnetic signals comprises an embedding of the reflection.

19. A non-transitory computer-readable storage medium having stored thereon instructions that, when executed by a computing device, cause the computing device to perform operations comprising:
causing a transmitter to emit electromagnetic radiation towards a portion of an environment, wherein a reflection of the electromagnetic radiation from the portion of the environment is received by an optical neural network (ONN), wherein the ONN is configured to generate an output array of electromagnetic signals, wherein the ONN comprises an input layer and one or more hidden layers optically connected to the input layer, wherein the input layer is configured to receive the reflection and generate an input array of electromagnetic signals based on the reflection, wherein the one or more hidden layers are configured to generate the output array of electromagnetic signals based on the input array of electromagnetic signals, wherein each respective hidden layer of the one or more hidden layers comprises: (i) a first optical component configured to receive a preceding array of electromagnetic signals from a preceding layer of the ONN and perform a linear transformation of the preceding array of electromagnetic signals to generate an intermediate array of electromagnetic signals, and (ii) a second optical component configured to receive the intermediate array of electromagnetic signals from the first optical component and perform a non-linear transformation of the intermediate array of electromagnetic signals, and wherein at least one property of each respective electromagnetic signal of the output array of electromagnetic signals represents a corresponding physical characteristic of a plurality of physical characteristics of the portion of the environment; and
receiving, from a detector array comprising a plurality of electromagnetic signal detectors, a plurality of values representing the plurality of physical characteristics, wherein the detector array is configured to receive the array of electromagnetic signals generated by the ONN, wherein each respective electromagnetic signal detector of the plurality of electromagnetic signal detectors is configured to measure the at least one property of a corresponding electromagnetic signal of the array of electromagnetic signals, and wherein each respective electromagnetic signal detector is configured to generate, based on the measured at least one property of the corresponding electromagnetic signal, a value representing the corresponding physical characteristic.

20. The non-transitory computer-readable storage medium of claim 19, wherein the operation further comprise:

detecting or classifying a physical feature within the environment based on one or more sets of values representing the plurality of physical characteristics of one or more portions of the environment.

* * * * *